United States Patent

[11] 3,582,628

[72] Inventor John A. Brussolo
Ann Arbor, Mich.
[21] Appl. No. 657,290
[22] Filed July 31, 1967
[45] Patented June 1, 1971
[73] Assignee Reliance Electric Company

[54] ANALOG-DIGITAL COMPUTER INTERCONNECTION SYSTEM
22 Claims, 8 Drawing Figs.

[52] U.S. Cl. .......... 235/150.5, 235/150.51
[51] Int. Cl. .......... G06j 3/00
[50] Field of Search .......... 235/150.5, 150.51, 150.52, 150.53, 150.3, 150.31, 150.4; 307/239; 340/347

[56] References Cited
UNITED STATES PATENTS 3,146,343 8/1964 Young .......... 235/150.5
3,341,697 9/1967 Kaufman et al. .......... 235/150.5X
3,406,379 10/1968 Palevsky et al. .......... 235/150.5X

*Primary Examiner*—Eugene G. Botz
*Assistant Examiner*—Joseph F. Ruggiero
*Attorney*—Richard G. Stephens ABSTRACT: A hybrid analog-digital computer including a plurality of analog computer elements for interconnection with a digital computer in which the digital computer input-output bus is connected to write operation code signals in a first register using a first address and to write control and address instructions in a second register into which control and address instructions also may be entered manually, and in which the digital computer uses a second output address to execute the operation stored in the first register, to control and address analog computer elements in accordance with the contents of the second register and to transfer data between the hybrid analog-digital computer and the digital computer.

INVENTOR.

BY

Richard G. Stephens

INVENTOR.

BY Richard G. Stephens

INVENTOR.

BY

Richard G. Stephens

INVENTOR.

BY

Richard G. Stephens

INVENTOR.

BY

Richard G. Stephens

INVENTOR.

BY

Richard G. Stephens

INVENTOR.

BY

Richard G Stephens

INVENTOR.

BY Richard G. Stephens

ANALOG-DIGITAL COMPUTER INTERCONNECTION SYSTEM

In the electronic general-purpose computer, automatic control, simulation and instrumentation arts, an increasing number of applications have arisen in which it is desirable that computation or control be effected by interconnected general-purpose digital computers and analog computers, usually to take advantage of the superior data-storage capabilities of a digital computer and to take advantage of the superior computing speed of the analog computer. General-purpose analog and digital computers frequently have been interconnected in the prior art, usually with a large number of wires patched between the two devices in a manner dictated by the nature of the specific types of problems to be solved.

Most, if not all such hybrid combinations have required (1) the connection of a large number of digital output signals from the digital computer to address specific components (such as analog electronic integrators) within the analog computer and to control the operating modes and time scales of the analog integrators, and to address and control various other devices, (2) the connection of a large number of digital signals to control the settings of coefficient potentiometers or equivalent variable resistances in the analog computer, (3) the connection of a number of timing signals between the two general-purpose computers to control data transfers between the two computers, (4) the connection of various "interrupt" signals between the two computers, and (5) the connection of "sense" lines for supplying the digital computer with encoded or digitized data which has resulted from analog computation.

In the prior art it has been common to apply signals from the digital computer to control various circuits within the analog computer, by supplying parallel multibit digital words to a first register within the analog computer, to accomplish analog computer logic mode control, time-scale control, problem verifying mode, and potentiometer setting, with a given data word from the digital computer representing a predetermined function. It also has been common in prior art arrangements to connect a number of "discrete" control line outputs from the digital computer to a logic patchboard associated with the analog computer, so that the computer operator can patch such lines to particular analog systems which he selects. It has been usual in the prior art to provide further registers in digital-to-analog converters to receive digital numerical data from the digital computer, and to provide a still further register for the analog-to-digital converter used to convert analog-computed quantities to provide signals out to the digital computer. In the prior art not only has a large number of registers been necessary for digital control, but many or all of them have had to be duplicated when alternate manual pushbutton control has been provided, at considerable expense. The prior art usually has required the engineering of complex and expensive "interface" equipment whenever the interconnection of general-purpose digital and analog computers has been desired, with a given interface ordinarily being suitable solely for use with a very limited number of digital computers. It is a primary object of the present invention to provide a basic hybrid computer which is readily connectable, without complex and expensive interface equipments being required, to a large number of different general-purpose digital computers. Many computation laboratories frequently include several different digital computers using different input-output signal formats. Because of the high cost of both digital and analog computers, it is often highly desirable that an interconnection system allow a given analog computer to be readily connected to any one of several different digital computers. The reconnection of prior art general-purpose analog computers to different digital computers has been extremely tedious and time-consuming, not only resulting in the loss of computer operating time while all of the many interconnecting circuits have been reconnected, but also requiring the provision of a different "interface" apparatus for each different combination of computers. In order to achieve maximum utility with a given amount of capital investment, it is highly desirable that an analog computer not only be readily capable of interconnection with a wide variety of different digital computers, but also that an analog or hybrid-analog-digital computer interconnected with a digital computer be easily switched between hybrid operation and manual operation. Thus it is another principal object of the invention to provide a hybrid computer apparatus connectable to a wide variety of digital computers which is still readily convertible to manual operation, without the need for duplicating a large number of registers.

It is ordinarily desirable that a digital computer which is interconnected to an analog computer also be connected to one or a number of the usual peripheral devices (such as magnetic tape units, for example) which are ordinarily used with the digital computer. In the present invention, by using a single data channel to interconnect the digital and analog computers, not only does a savings in registers result, but the digital computer input-output register sees the same "load" when feeding the hybrid computer of the present invention as it does with any of the ordinary peripheral devices it was designed to feed or receive data from. Furthermore, in the present invention, by providing one larger register instead of a large number of small registers, a more efficient use of a given amount of register capacity can be made, so that fewer bits are needed in the single register of the invention than the total of all of the bits of the plural prior art registers.

A further object of the invention is to provide a hybrid computer device connectable to a digital computer for which programming is simplified. The prior art systems using special interface equipments have required the programmer to write each program with the special interface coding in mind, considerably complicating the programming of a digital computer.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 3:
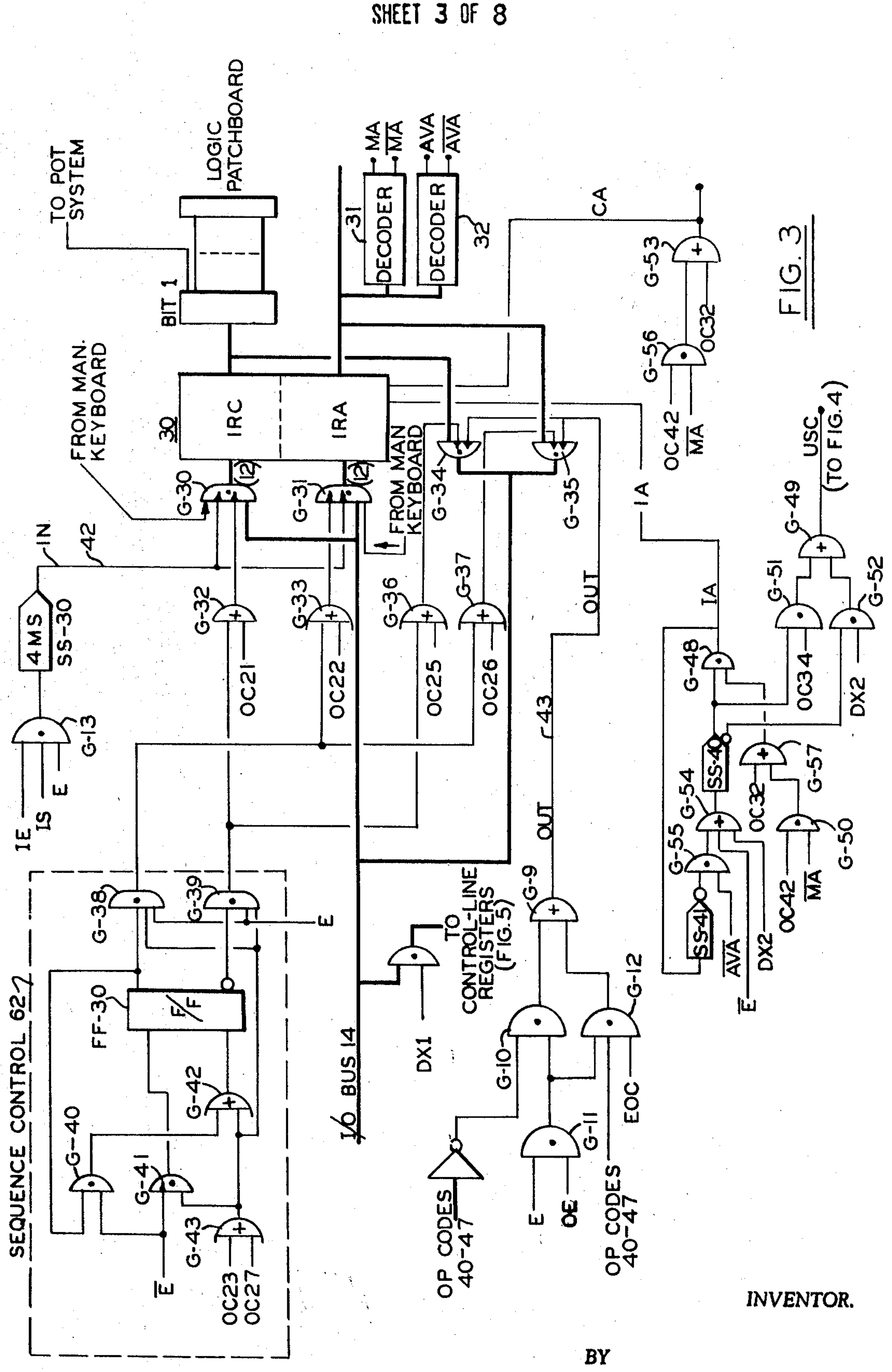
FIG. 3 is a schematic diagram illustrating the manner in which data is transmitted between the instruction register 30 of FIG. 1 and the computer input-output bus 14.
Figure 3A:
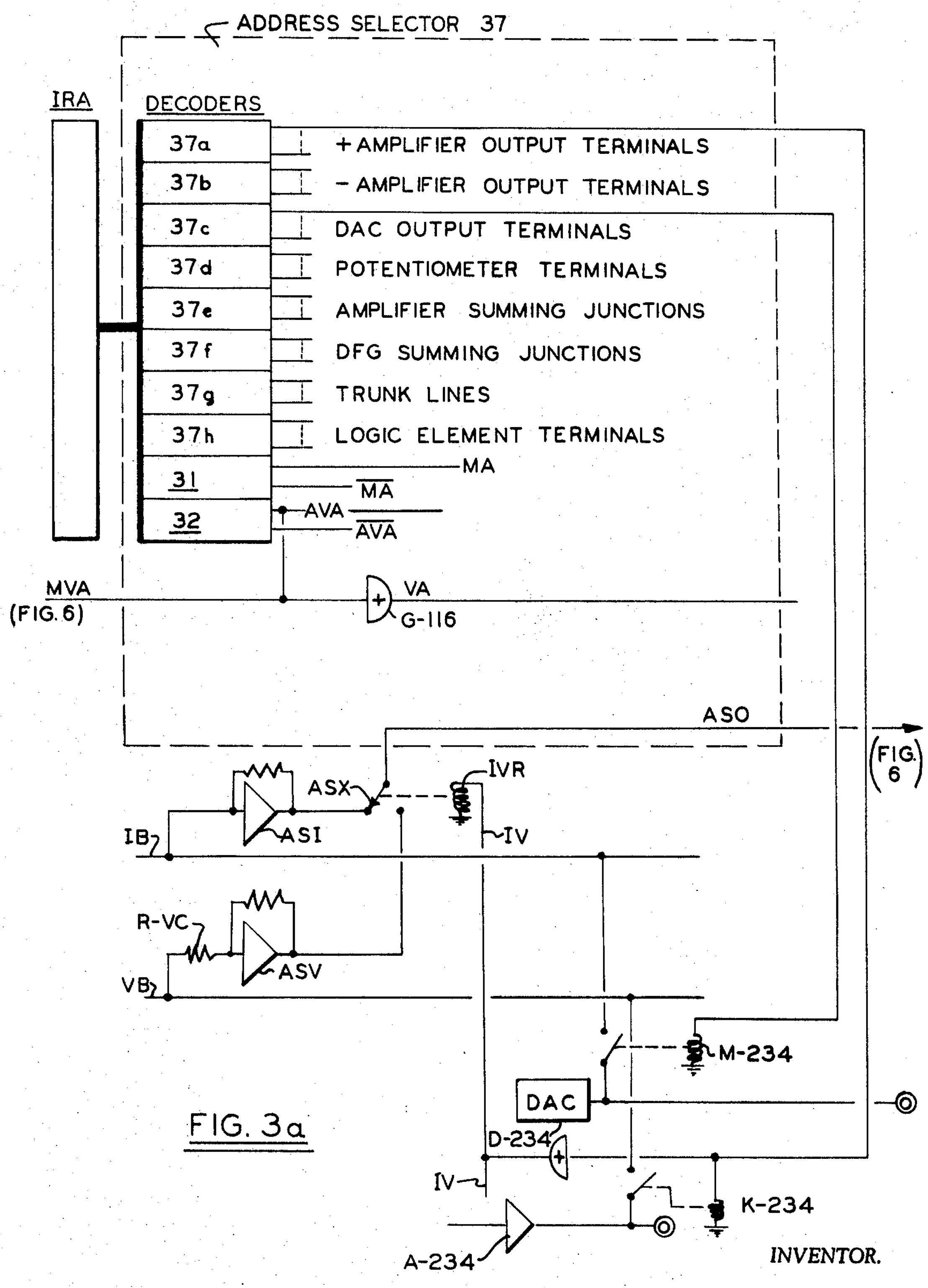

FIG. 3*a* is a schematic diagram of one form of address selector system which may be used with the present invention.

Figure 1:
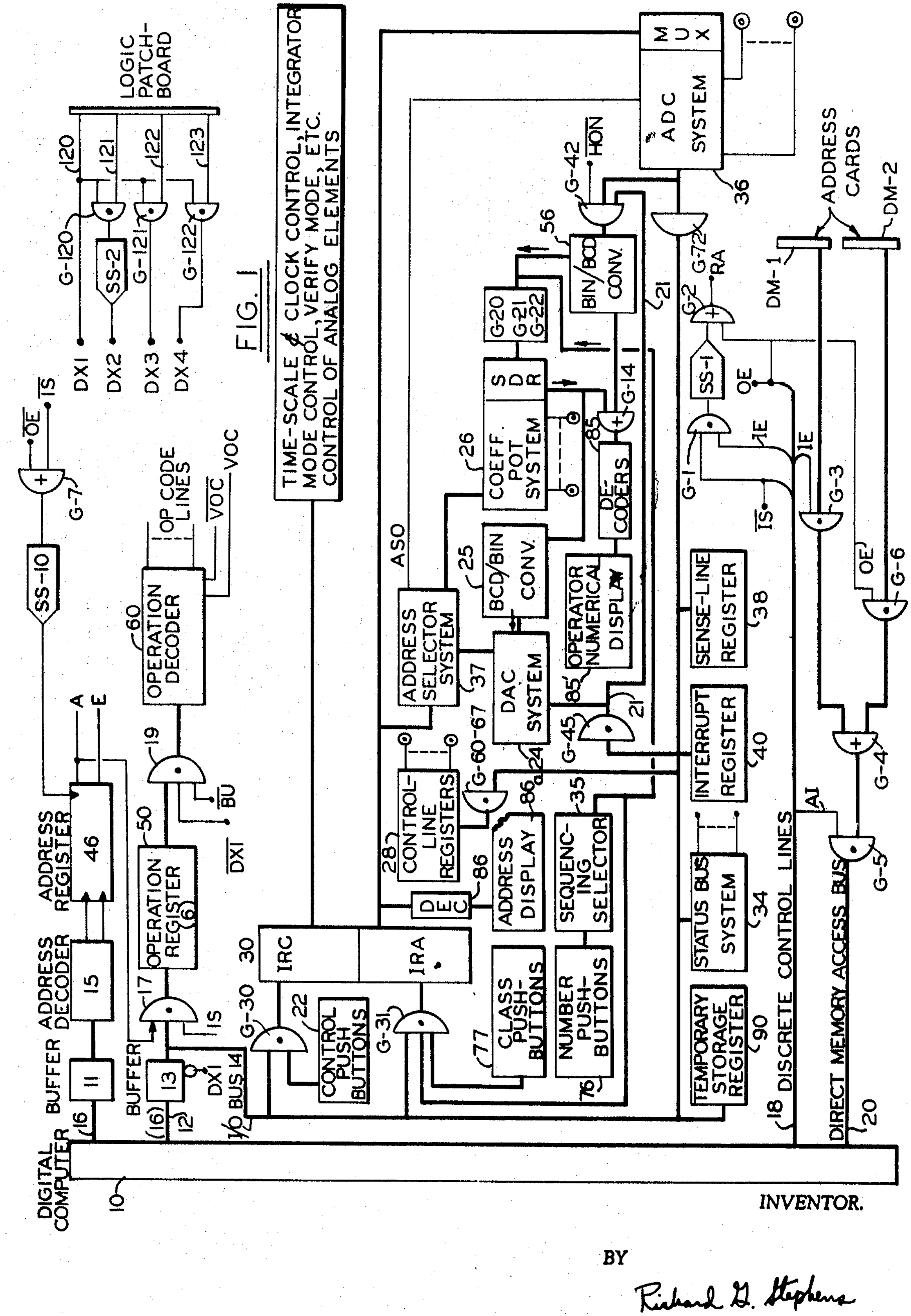
FIG. 1 is a generalized diagram, largely in block form, illustrating the manner in which an exemplary hybrid computer constructed in accordance with the present invention may be connected to a typical scientific digital computer.
Figure 4:
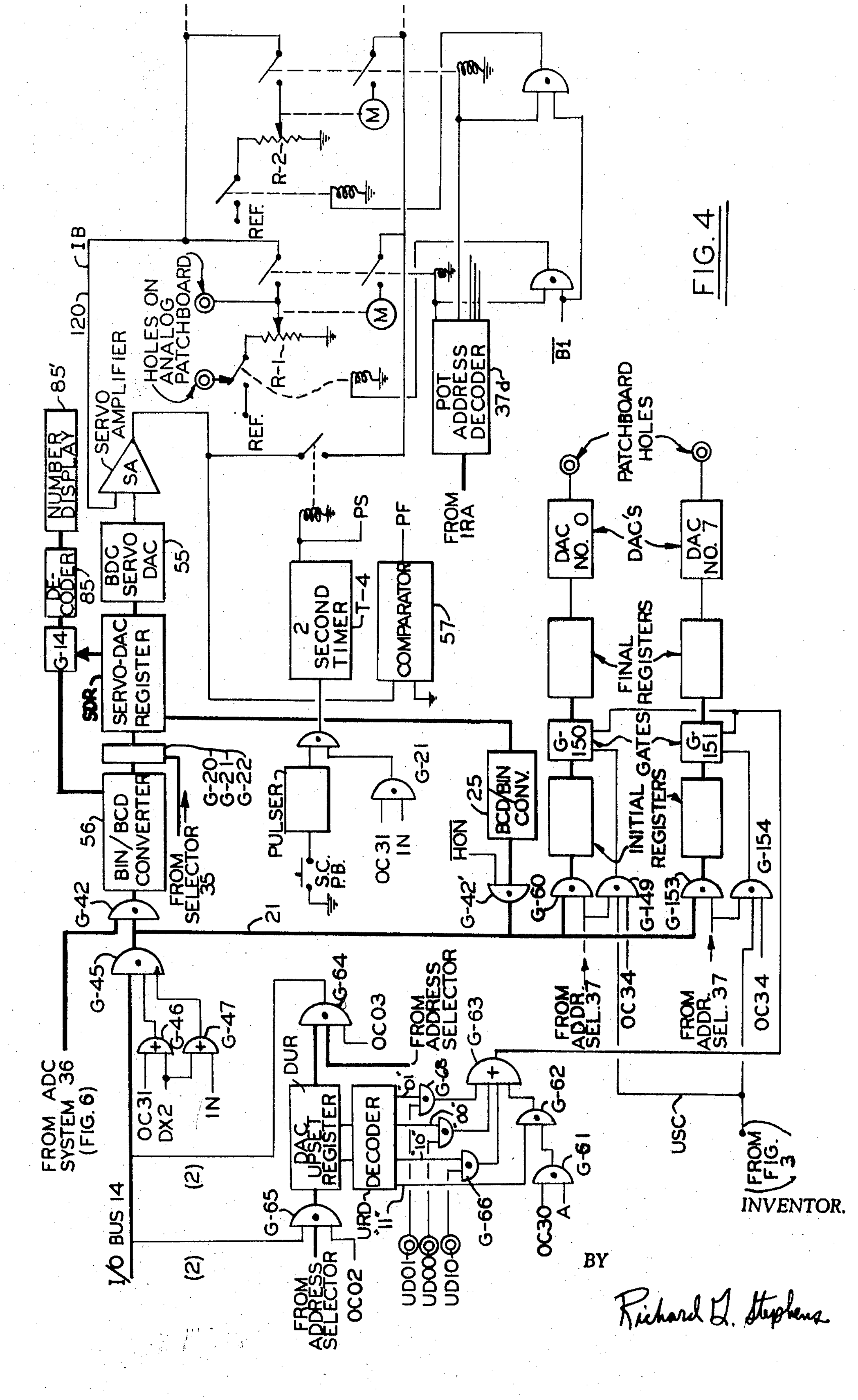

FIG. 4 is a schematic diagram illustrating the manner in which information is transferred from the hybrid computer input-output bus to the digital-to-analog conversion or "-DAC" system 24 of FIG. 1.

Figure 5:
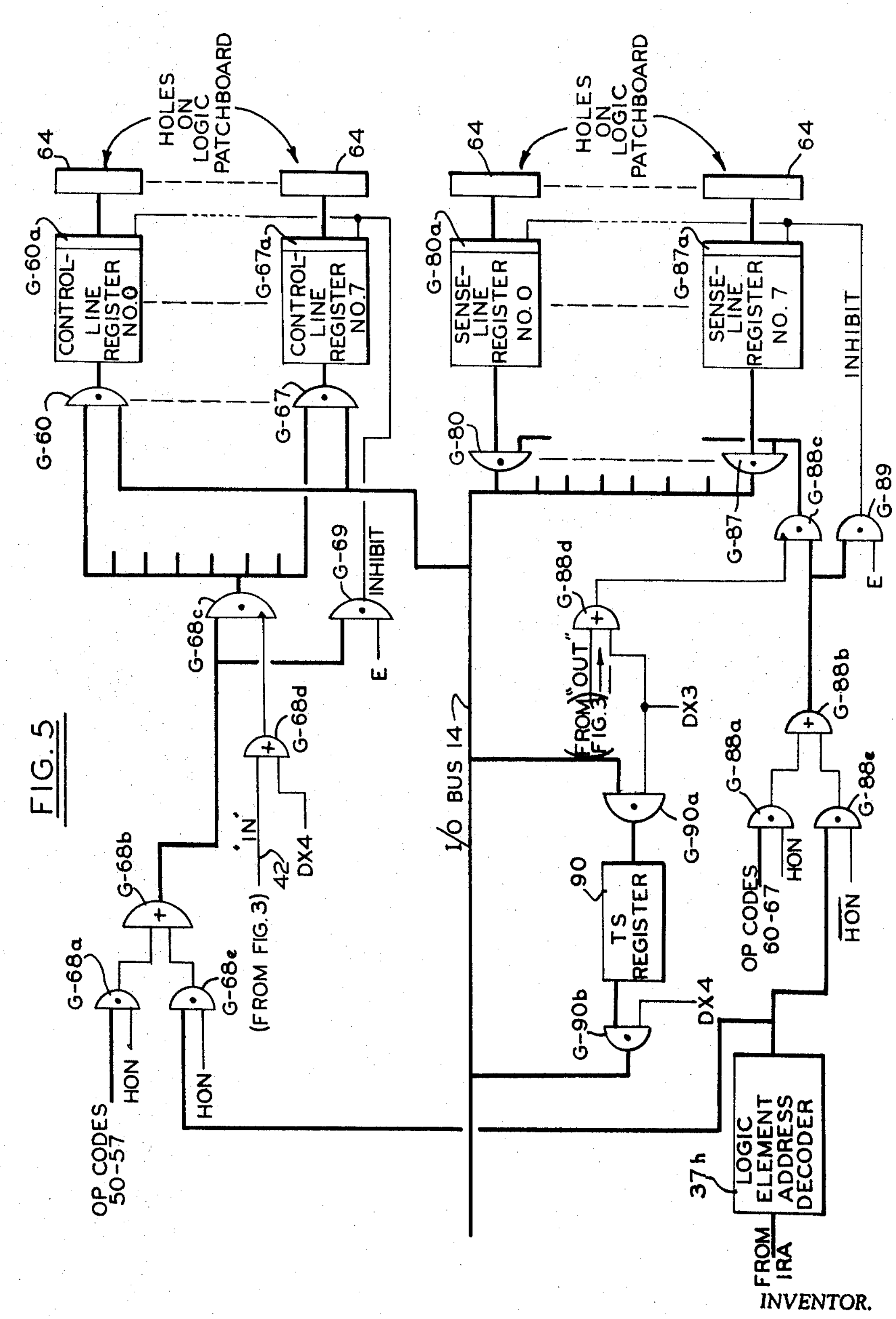

FIG. 5 is a schematic diagram illustrating the manner in which data is transferred from the input-output bus into the control line registers 28 of FIG. 1, from the sense-line registers 38 of FIG. 1 out to the input-output bus, and between the sense-line and control-line registers.

Figure 6:
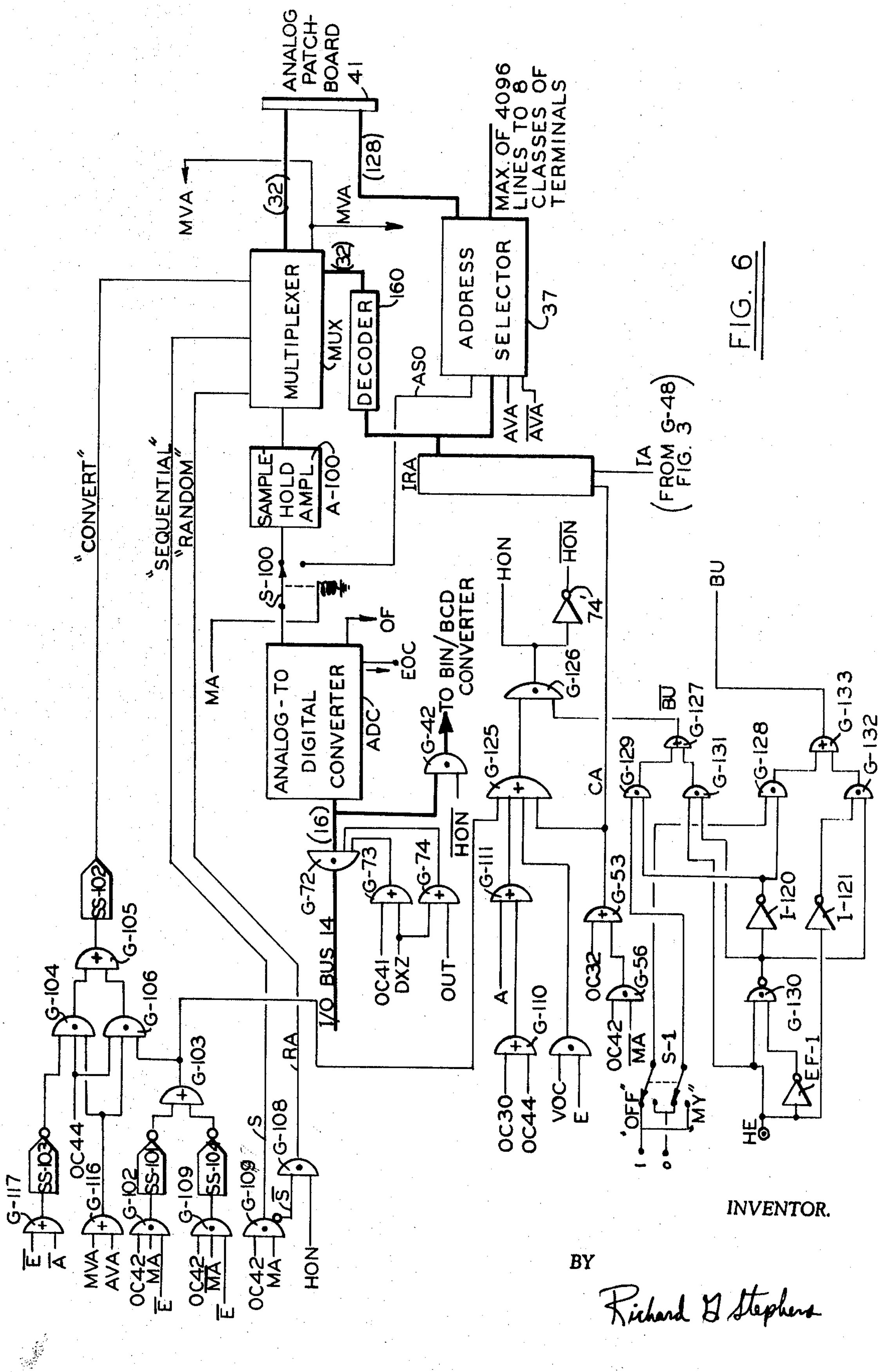

FIG. 6 is a schematic diagram illustrating how control and transfer out of information from the analog-to-digital converter system 36 of FIG. 1 may be provided.

Figure 7:
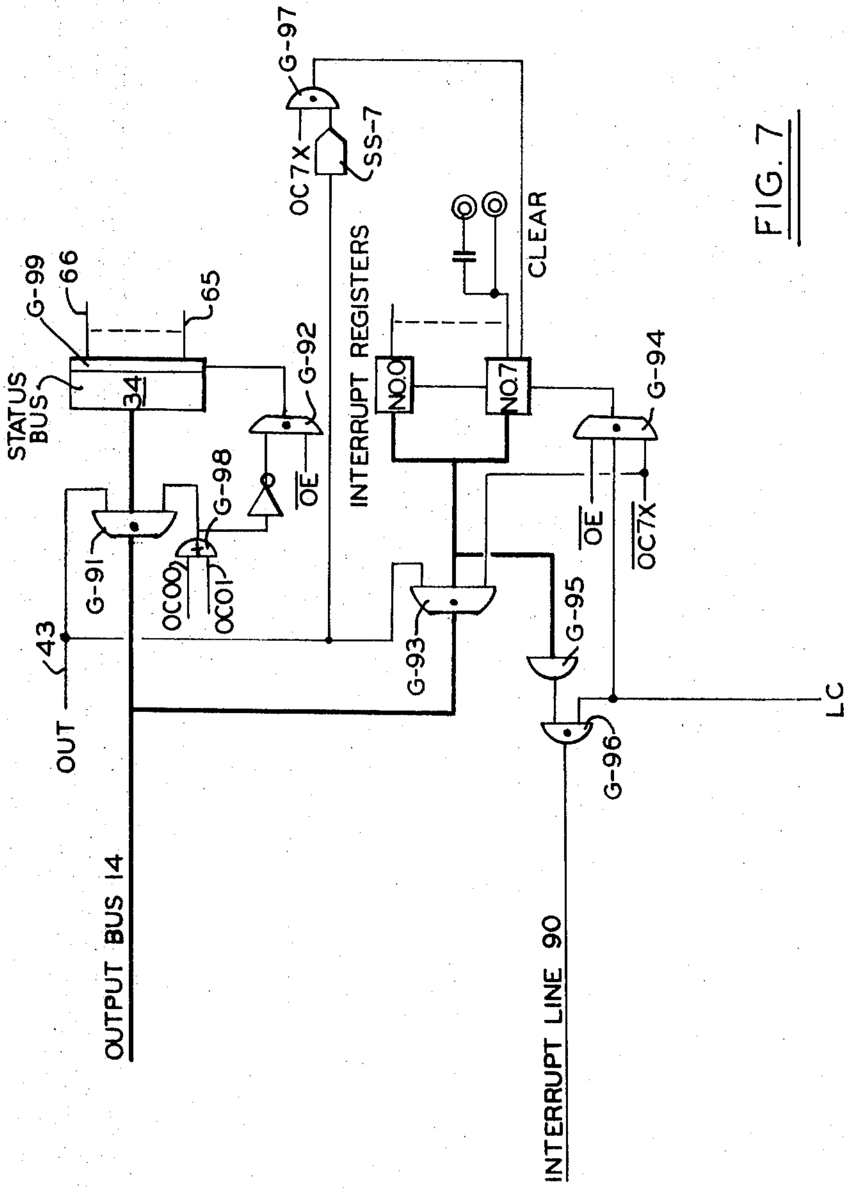

FIG. 7 is a schematic diagram illustrating how the contents of the status bus system 34 and the interrupt register system 40 are controlled to be outputted onto I/O bus 14 of FIG. 1.

It is to be understood that the hybrid computer of the present invention incorporates the basic equipment of a large contemporary general-purpose analog computer, including a large number (e.g. 256) of operational amplifiers, and numbers of servo-set potentiometers, electronic comparators, multipliers, function generators and other analog computer components of known types, together with one or more patchboards for interconnecting such analog computer elements into desired configurations dependent upon the problems to be solved. For sake of clarity, and in order not to obscure the present invention, much of the conventional analog computer equipment incorporated in the hybrid computer has not been shown in the drawings.

In the drawings, for sake of clarity, many combinations of plural lines are drawn as single lines, and numerals in parenthesis are utilized to show the number of binary bits carried by various groups of lines drawn as single lines, and to show the bit capacities of various registers and the like. For ease of illustration, the derivation of only one of a pair of complementary signals has been shown at some places. With a given logic signal shown derived from one output line of a flip-flop, for example, those skilled in the art will recognize that its complement, indicated by a bar in conventional manner, will be readily available, and that the complement of any logic signal may be readily provided by a simple inverter, some of which have not been shown. Similarly, where a plurality of parallel lines all connect through a plurality of respective gates all controlled by the same gating signal, a single gate has been shown in the drawings. AND gate and OR gate circuits have been shown for sake of simplicity, and those skilled in the art will recognize that NOR and NAND gate circuits may be substituted. A number of decoders are shown as simple blocks for sake of simplicity.

Referring to the generalized diagram of FIG. 1, digital computer 10 is shown connected to the hybrid computer by means of 16 bus lines indicated at 12 through a gated buffer circuit 13 to input-output or "I/O" bus 14 by means of a plurality (typically 6 to 8) of address bus lines indicated at 16, a plurality (typically 6 to 8) "discrete" control lines indicated at 18, and where the digital computer is capable of direct memory access, a plurality (typically 6 to 16) of direct memory address bus lines indicated at 20. Buffer 13, and also buffer 11 mentioned below, each comprise simple and conventional voltage-level changing circuits which are required when the digital computer logic signal levels differ from those of the hybrid computer. Buffer 13 is shown in FIG. 1 as comprising a gated buffer, connected to receive an internal "data transfer" signal DX1. As will be seen below, the DX1 signal inhibits data transfer through buffer 13 while data is being transferred internally within the hybrid computer over the hybrid computer input-output bus 14. The 16 lines shown at 12 connect to both the input and output busses of the digital computer, and many digital computers utilize a single set of lines for both input and output.

Most digital computers include from six to eight lines which are enabled simultaneously with the computer input-output bus in order to address one or more specific peripheral devices, such as magnetic tape readers and recorders and the like. Two unique addresses of that type are used to interconnect the hybrid computer to be described. In FIG. 1 the address lines at 16 are applied through buffer 11 and address decoder 15 to address register 46, a 2-bit register which stores the two mentioned addresses. Equivalent operation may be used with digital computers having no external address bus by using a further two lines of the digital computer input-output bus 12 to control address register 46. Only three of the four possible states of 2-bit register 46 need be used. A "00" signal in register 46 is used to specify that no data is being transmitted on lines 12 in either direction between digital computer 10 and the hybrid computer. A "10" signal in register 46 enables line A to establish an "access" condition, while a "01" signal in register 46 enables line E to establish an "execute" condition. The provision of an A signal controls AND gate system 17 to load a 6-bit word from I/O bus 14 into a 6-bit operation register 50, and then a subsequent E signal from address register 46 effects the execution of whatever operation code is then stored in operation register 50. (Two particular operation codes are instead executed immediately upon occurrence of an A signal, as will be described below). Transfer of an operation code word into operation register 50 also may require a simultaneous "input strobe" signal, as indicated by the IS input to gate circuit 17. The IS signal is provided by digital computer 10 on one of the discrete control lines of group 18, and comprises the signal ordinarily provided by the digital computer to strobe date into its various peripheral devices. Shortly after the end of any IS "input strobe" signal, or shortly after the end of any "output enabling" signal OE from the digital computer, an output signal generated by single-shot delay circuit SS–10 from an input from OR gate G–7 will be seen in FIG. 1 to apply a "clear" signal to address register 46, to clear the register and ready it for receipt of another address signal from digital computer 10. The arrows at the connections to address register 46 indicate that it is AC-coupled to address decoder 15 and single-shot delay circuit SS–10.

The function of input/output or "I/O" bus 14 is to route the 16-bit digital words, whether they comprise numerical data words or instruction words, throughout the hybrid computer. Input data words are connected at various times, by control gating circuits G-45 and pot-DAC bus 21 to either the digital-to-analog converter or "DAC" system indicated at 24, to be converted to analog voltages, or connected to servo-set coefficient potentiometers of a coefficient potentiometer system indicated at 26 to adjust the shaft positions of the potentiometers. The analog voltages from DAC system 24 and from pot system 26 are routed to respective holes on the hybrid computer analog patchboard, from where they may be patched in conventional analog computer manner in accordance with the requirements of a particular problem to be solved. The input instruction words on I/O bus 14 are connected at various times either via gate circuit 17 to operation register 50, or via gate circuit G-30 or gate circuit G-31 to either a 12-bit control section IRC, or the 12-bit address section IRA, of instruction register 30. The instruction words in section IRC of register 30 control the hybrid computer time-scaling, clock frequency, integrator modes and other computation modes. The words in address section IRA of register 30 control a large number of gate circuits of address selector system 37 to route the information on I/O bus 14 to and from a large variety of devices and systems to be described. As well as receiving input data from I/O bus 14, the control section IRC of instruction register 30 sometimes is connected by means of gates G130 to receive input data from a group of control pushbuttons indicated collectively at 22, and address section IRA sometimes is connected by means of gate circuit G-31 to receive address data from a group of numeric and "class" pushbuttons indicated collectively at 76 and 77, respectively, the data resulting from operation of successive number pushbuttons being applied to gate G-31 through sequencing selector 35.

The output information transmitted over I/O bus 14 includes, at appropriate times, either (1) the date on a 12-wire status bus 34, (2) a digital word representing numerical data from the analog-to-digital converter ADC system 36, (3) a digital word from one of a group of eight sense-line registers indicated collectively at 38, or (4) signals from one register of a group of interrupt registers indicated at 40. As well as connecting digital signals into and out of the hybrid computer, I/O bus 14 is also used for internal data transfers within the hybrid computer. For example, a digital number provided from ADC system 36 from conversion of an analog value, or the contents of one of the sense-line registers of group 38 may be routed to one of a group of control-line registers indicated at 28, to be stored and connected to holes on the hybrid computer logic patchboard, or routed to DAC system 24 or pot system 26 to set a DAC or a servo-set potentiometer. As will be seen below, the control-line registers of group 38 are connected to I/O bus 14 by the application of specific operation code signals from operation register 50, which select the one of the control-line registers into which data is to be transferred. As shown in the upper righthand corner of FIG. 1, the DX1 data transfer enabling signal and the DX2 data transfer strobe signal are derived by connecting any desired logic signals to holes on the hybrid computer logic patchboard.

The 12-wire status bus 34 provides a plurality of signals on output bus 14 to indicate to the digital computer the occurrence or presence of a number of different conditions within the hybrid computer. The twelve lines from status bus 34 may be used to signal various error conditions and "flad" conditions. Within the hybrid computer a variety of "error" condition signals are generated in conventional manner, including, for example, signals to indicate (1) an amplifier overload, (2) that a potentiometer-adjusting servomechanism failed to "-null," or balance (3) a multiplier overrange, (4) that a non-valid address has been selected (i.e. that no component is installed at the address which has been selected), and (5) overflow by the analog-to-digital converter. Signals representing various of these error conditions preferably are routed to individual lines of status bus system 34, and groups of such signals, or all of such signals are also applied together to an or gate (not shown) to energize one or more lines of status bus system 34 to indicate that any one of more of such error conditions exist. Also, one or more holes on the logic patchboard are provided for the operator to connect to any desired terminals, and such holes are connected to status bus lines so that any logic signal may be treated as an error condition signal. Status bus system 34 also includes a number of lines which carry signals indicating the occurrence of presence of "flag" conditions, such as the end of an analog-to-digital conversion cycle, for example. A "hybrid on" signal HON, which is generated as shown in FIG. 6, and which indicates that data is being transferred (or that an analog operation is occurring after which data will be transferred) is also provided on the line of bus 34. During the presence of "hybrid on" signal HON, manual disruption or alteration of computation by the pushbuttons is inhibited. Also, by placing a switch (S-1 in FIG. 6) in an "off" condition, the operator can prevent control of the hybrid computer by the digital computer, and during such a condition, a "busy" signal BU is provided on one line of status bus 34.

The several discrete interface control lines identified at 18 include an "input enable" line IE which carries conventional signals from digital computer 10 indicating that data has been placed on bus 12, and that such data is stable and can be sensed or read by the hybrid computer. Bus 18 also includes the mentioned "input strobe" line IS, which then enables gate circuit 17 to load the data on I/O bus 14 into operation register 50. Most digital computers include similar "enable" and "strobe" lines which are used to time data transfers to peripheral devices, with the "strobe" pulse occurring in between the leading and trailing edge of the "enable" pulse. As shown at the top of FIG. 3, the "input enable" signal IE, the "input strobe" pulse IS, and the "execute" pulse E from address register 46, are all "anded" by AND gate G-13, to provide an "IN" timing pulse from single-shot SS-30 on line 42, and as will be seen below, the IN signal is used to enable various gates to write data into various of the subsystems to be described. The group of control lines at 18 in FIG. 1 also includes an "output enable" (OE) line to provide a signal from the digital computer to the hybrid computer to indicate to the hybrid computer that the digital computer is ready to accept data from the hybrid computer on the digital computer I/O bus 12. The "input enable" signal IE and the input strobe signal IS inverted, or $\overline{IS}$, are applied via an AND gate G-1 and a single-shot delay SS-1 to provide a "ready" signal RA when data is being transferred from the digital computer to the hybrid computer, and the "output enable" signal OE is applied with a short propagation delay, to provide the "ready" signal when data is to be transferred in the opposite direction, from the hybrid computer to the digital computer. Thus the "ready" signal RA, which is provided on a further one of the discrete control lines of group 18, operates to inform the digital computer either (1) that the hybrid computer has accepted and read the data on I/O bus line 14, or (2) that data has been placed on I/O bus 14 by the hybrid computer and that such data is stable and can be taken by digital computer 10. During hybrid computer operations other than analog-to-digital conversions an output signal OUT is provided on line 43 from OR gate G-9, as shown in FIG. 3, upon occurrence of the "output enable" signal (OE) from the digital computer and an "execute" signal E from address register 46 to provide a simultaneous output from AND gate G-11, During analog-to-digital conversions, (which are represented by the presence of any one of the op code signals OC40 to OC47 as an input to AND gate G-12 in FIG. 3), the output signal OUT is provided by the simultaneous occurrence of not only the "execute" (E) and"output enable" (OE) signals, but also requires an "end-of-conversion" or "EOC" signal from the ADC converter system 36. As will be seen below the OUT signal is used to read out data from various of the subsystems to be described. In addition to the four mentioned control lines, additional lines (not shown) of bus 18 may include an "output strobe" line to activate the digital computer to load the data on output bus 14 into a digital computer register, one or more "channel interrupt" lines by which the hybrid computer can indicate to the digital computer that the hybrid computer requires service on a given digital computer output data channel, and an "interrupt bus" to indicate generally to the digital computer main or central processor that the hybrid computer requires service. In some installations the discrete control lines may include an "address interrogate" line AI over which the digital computer signals its requirement for the address of a digital computer memory location from which to take data or in which to insert data. For example, those embodiments of the invention utilized with digital computers having a directly addressable memory may include one or more wired address cards, which provide a parallel multibit address signal upon receipt of the "address interrogate" signal AI. As shown in FIG. 1, the AI signal from digital computer 10 connects the contents of address card DM-1 to lines 20 via gates G-3, G-4, and G-5 when data is to be transferred from the digital computer to the hybrid computer (as indicated by the application of an "input enable" signal IE to gate circuit G-3 in FIG. 1), and connects instead the contents of address card DM-2 to lines 20 via gates G-6, G-4 and G-5 when data is to be transferred in the opposite direction, as indicated by the "output enable" signal OE applied to gate circuit G-6 in FIG. 1. The group of (typically 6—16) lines shown at 20 in FIG. 1 represents the lines over which such address words are routed from the hybrid computer to the digital computer for such direct memory access.

The apparatus of the invention is designed to operate in conjunction with the digital computer in a plurality of operating modes, some of which are effected automatically and some of which are effected manually. To prevent accidental or erroneous manual pushbutton operation from interfering with solution of a problem, a "Console Lock" hole 51 (See FIG. 2) is provided on the hybrid computer logic patchboard. When a logic "1" signal is patched, a console lock (CL) signal disables all of the switches on the manual control panel, in a manner to be made apparent below. The manual control panel also carries "HYBRID" switch S-1 (FIG. 6) which is manually switchable between "HYBRID" and "OFF" positions, as will be further explained below. When switch S-1 is in the "OFF" position, the hybrid computer console cannot be controlled by digital computer 10 except to read out the contents of status register 34, and one wire of status bus 34 supplies a "busy" signal BU to digital computer 10. When "Hybrid" switch S-1 is in the "HYBRID" position, the hybrid computer may be accessed by digital computer 10 to provide any of the normal hybrid computing operations. With switch S-1 in the "Hybrid" position, the hybrid computer operates in either its "Access" mode or its "Hybrid on" mode. During the "Access" mode, which is indicated by a $\overline{HON}$ signal, the circuits of the hybrid computer are controllable from the manual control panel and the logic patchboard During the 'Hybrid on'' mode, which is indicated by a HON signal, digital computer 10 alone controls the hybrid console and overrides any control operations attempted from the control panel and/or logic patchboard. The ''Hybrid on'' mode occurs whenever an internal data word transfer is occurring from one system to another within the hybrid computer, or whenever the digital computer must await the completion of an operation, such as an analog-to-digital conversion, or the setting of a pot, for example, then taking place in the hybrid computer. The manner in which the "HYBRID ON" control signal is derived is explained below in connection with FIG. 6.

Operation register 50 (FIG. 1) comprises a 6-bit register connected to receive the signals on six lines of I/O bus 14 via gate circuit 17 upon occurrence of an "access" (A) signal from address register 46 and the input strobe (IS) signal from the digital computer. The 6 bits in operation register 50 are conveniently coded in octal form to allow as many as 64 possible "op code" signals numbered in octal form from 00 to 77. Bit spaces 0, 1 and 2 of operation register 50 may represent the first digit of the op code and bit spaces 3, 4 and 5 represent the second digit, through the use of such a coding system is, of course, optional. As mentioned above, the occurrence of an "access" address on lines 16 from digital computer 10 results in an A signal from address register 46, and the A "access" signal, together with the input strobe signal IS, enables gate circuit 17 to load a 6-bit operation code word into operation register 50. The contents of operation register 50 are applied to AND gate circuit 19 to be applied directly to operation decoder 60 (assuming that no internal data transfer is then occurring and that no "busy" condition then exists, as indicated by the "$\overline{\text{DXI}}$" and $\overline{\text{BU}}$ input signals to AND gate circuit 19). Derivation of the $\overline{\text{BU}}$ signal is explained below in connection with FIG. 6. Decoder 60 decodes the word in register 50 to energize a selected one or several of the 64 possible lines to establish a selected operation. Decoder 60, which may comprise a simple diode gate decoder, also provides a "valid on code" signal VOC, or a "nonvalid op code" signal $\overline{\text{VOC}}$, depending upon whether or not the number inserted in operation register 50 corresponds to any operation provided to be performed. The following table illustrates an exemplary operations code and describes the function provided by various "op code" numbers. The meaning of various of the terms in the Table will become more clear as the description proceeds.

TABLE I

| OP code | Function |
|---|---|
| 00 | Put hybrid computer in "Access" mode to allow control manually by pushbuttons and from logic patchboard, read out status bus. |
| 01 | Read out status bus 34. |
| 02 | Write digital word (2 bits) into DAC update register DUR. |
| 03 | Read out DAC update register (2 bits). |
| 20–27 | Instruction register. |
| 21 | Write digital word into IRC (control portion of instruction register 30). |
| 22 | Write digital word into IRA (address portion of instruction register 30). |
| 23 | Write 1 or 2 digital words successively into the two halves of instruction register 30. |
| 25 | Read out control portion IRC of instruction register 30. |
| 26 | Read out address portion IRA of instruction register 30. |
| 27 | Read out both portions of instruction register 30. |
| 30-37 | Pot/DAC control. |
| 30 | Generate update signal for all CAD's simultaneously. |
| 31 | Set value into DAC initial register, or into BIN/BOD converter to set potentiometer. |
| 32 | Increment address at end of instruction. |
| 34 | Update DAC final register at end of instruction. |
| 40-47 | ADC control. |
| 41 | Read out ADC value. |
| 42 | Increment address at end of instruction. |
| 44 | Initiate conversion at end of instruction. |
| 50-57 | Control Line Register Input. |
| 50 | Write digital word into control line register No. 0. |
| 51 | Write digital word into control line register No. 1. |
| 57 | Write digital word into control line register No. 7. |
| 60–67 | Sense-Line Read Out. |
| 60 | Read out contents of sense-line register No. 0. |
| 67 | Read out contents of sense-line register No. 7. |
| 70-77 | Interrupt Register Read Out. |
| 70 | Read out contents of interrupt register No. 0. |
| 77 | Read out contents of interrupt register No. 7. |

It may be seen that in addition to the specific single-operation op codes listed in Table I, certain of the cop codes may be combined to provide several successive operations with a single programming step. For example, because the effect of the octal number 37 equals the sum of the effects of octal numbers 31, 32 and 34, writing the op code 37 number in operation register 50 results in the operations of all three of op codes 31, 32 and 34 being performed, and programming an op code 47 results in op codes 41, 42 and 44 all being performed, considerably simplifying the programming of many problems. Similarly, it will be seen from Table I that op code 23 provides the operations of both op code 21 and op code 22.

In the drawings the connection of various output lines of operation decoder 60 to various gates is shown by the legend "OC" together with the appropriate op code number from Table I. After a given op code signal has been placed in operation register 50, execution of the op code awaits the occurrence subsequently of both an enabling signal (i.e. an "input enable" or "output enable" signal from digital computer 10 and an "execute" or E output signal from address register 46 (except in the case of op code 00, which establishes manual pushbutton and logic patchboard control in lieu of digital computer control and serves to read out the contents of status register 34, and except in the case of op code 30, which generates a "DAC update signal." The "DAC update" on code 30 signal is itself an execution instruction rather than an operation to be performed on the next execute (E) signal from address register 46. As will be seen below, op code 30 merely results in data which was previously transferred into or within the hybrid computer being shifted from one set of registers in the hybrid computer to another set of registers within the hybrid computer, so that op code 30 may be executed immediately).

The manner in which words may be written into and read out of instruction register 30 by the digital computer may be better understood from consideration of FIG. 3 and op codes 20—27 of Table I. The manner in which information may be entered manually into instruction register 30 is not shown, for sake of simplicity, in FIG. 3, and will be shown and described below in connection with FIGS. 2*a* and 2*b*. In FIG. 3 AND gate circuits G–30 and G–31 each will be seen to connect a particular group of 12 lines of I/O bus 14 to one section of instruction register 30 upon the occurrence of both an IN signal on line 42 and an input signal from one of OR gates G–32 or G–33. The IN signal is generated by single-shot delay SS–30 shortly after AND gate G–13 has received the input enable (IE) and input strobe (IS) signals from the digital computer and the "execute" signal E from address register 46 of the hybrid computer. Op code 21 provides writing into section IRC of register 30 and op code 22 governs writing into section IRA of register 30. Gate G–32 is enabled by op code 21 (or by an output from gate G–39 of sequence control 62) to write a 12-bit word into the control section IRC of instruction register 30, and gate G–33 is similarly enabled by occurrence of an op code 22 (or by an output from gate G–38 of sequence control 62) to write a 12-bit word into address section IRA of instruction register 30. Op code 25 relates to reading the instruction word out of control section IRC of instruction register 30, and op code 26 relates to reading the instruction word out of address section IRA of register 30. AND gate circuits G–34 and G–35 each will be seen to connect respective sections of instruction register 30 to I/O bus 14 upon receipt of an OUT signal and a respective output signal from gate G–36 or G–37, which latter signals occur from an op code 25 or op code 26 signal, or from an output signal from gate G–39 or gate G–38 of sequence control 62. Sequence control 62 connects the two halves of instruction register 30 successively to I/O bus 14, so that both halves of the instruction register may be filled or read out with a single "access" (A) signal from address register 46. Upon the application of an op code 23 signal ("-Write 12-bit words in both sections of register 30") the output of OR gate G–43, the normally " 1"output of flip-flop FF–30, and the "execute" (E) signal from address register 46, enable gate G–39, thereby enabling OR gate G–32 and AND gate G–30, and thereby connecting 12 wires of I/O bus 14 into register section IRC. At the end of the "execute" signal E, its fall is AC-coupled to enable gate G–41, triggering flip-flop 30. With FF–30 triggered, it will be seen that an immediately following further "execute" (E) signal will enable AND gate G–38, thereby enabling gates G–33 and G–31 to connect I/O bus 14 to address section IRA of instruction register 30. Thus using op code 23, successive "execute" signals may be applied to successively switch flip-flop FF–30 back and forth, alternately connecting I/O bus 14 to the IRC section and the IRA section without the need for intervening "access" (A) signals from digital computer 10. The similar operation of sequence control 62 to allow reading out successively from both sections of register 30 with a single A signal from register 46, by successively enabling gates G–34 and G–35 via gates G–36 and G–37 will be apparent at this point without further explanation.

The control section IRC of instruction register 30 controls the analog modes of operation of the hybrid computer, and the address section IRA of register 30 directs address selector 37 and the high-speed multiplexer of ADC system 36. The 12-bit control section IRC of instruction register 30 preferably carries information of the following types:

| Bit place: | Control function |
|---|---|
| 1 | Coefficient type |
| 2, 3 | Clock control |
| 4, 5 | Time scale |
| 6 | Logic executive |
| 7, 8 | Logic mode |
| 9 | Problem verify |
| 10, 11 | Analog mode |

In cases where a coefficient device, such as a potentiometer, is being monitored, bit space 1 specifies whether the coefficient setting is to be read or whether the device output (i.e. the input signal times the setting) is to be monitored, as will be explained in connection with FIG. 4, and it will be understood that conventional switching circuits (not shown) within the hybrid computer are connected to be responsive to the signal in bit space 1 to control the manner in which a potentiometer being monitored is connected to the monitoring device. Bit spaces 2 and 3 control conventional circuits (not shown) to allow any one of four different clock pulse or timing sources to be selected to control the hybrid computer logic circuits. Bit spaces 4 and 5 allow selection of any of four time-scale multipliers. Bit 6 controls the "Logic Executive" mode, or otherwise expressed, determines the operating significance of bits 7 and 8. Bits 7 and 8 always specify the logic mode, and serve to switch the synchronous logic circuits of the hybrid console between "Load," "Stop" and "Run" modes. If, however, the "logic executive" bit is "1," bits 7 and 8 also control the modes of the electronic integrators of the hybrid computer, switching the integrators between their "Initial Condition," "-Hold" and "Operate" modes as the logic is switched between its "Load," "Run" and "stop" modes, respectively. Bit 9 determines whether the hybrid console is or is not in the "-Problem Verify" mode. Bits 10 and 11 select one of the three analog operating modes "Initial Condition" or "Reset," "-Hold" or "operate" to control the electronic integrators, unless a "1" bit in space 7 has put integrator control under the logic circuits, as mentioned above. It will be appreciated that the contents of register section IRC may be routed throughout the hybrid computer and connected to a large number of switches to provide the above-mentioned functions in a known manner which will be apparent to those skilled in the art. A preferred manner in which various of the output signals from such a register may be routed to the various devices to be controlled is shown in application Ser. No. 635,294, filed Apr. 14, 1967 by Elmer G. Gilbert and assigned to the same assignee as the present invention.

The output lines from 12-bit address section IRA of instruction register 30 are routed throughout the hybrid computer to provide the necessary address information to direct the address selector 37 (FIG. 1) to a particular component, to direct the multiplexer MUX (See FIG. 6) of the analog-to-digital converter system 36 to a given one of its input channels, and to address particular DAC's of DAC system 24 or pots of system 26 to insert or extract digital words into or out of particular DAC's, or to set particular pots. As well as operating as a simple 12-bit register, section IRA of register 30 is also reconnectable, by means of a well-known form of internal switching (not shown) to be converted into a 12-stage binary counter upon application of a single on line Ca, and when connected into a counter configuration, successive pulses on line IA advance the count in IRA to provide successive addresses. Such a feature is useful both for setting a series of successive DAC's or pots, or for digitizing a series of analog voltages, as will be explained below in connection with FIGS. 4 and 6. In FIG. 3 it will be seen that register IRA will be reconnected to counter form by a Ca signal via gate G-53 either by provision of an op code 32, which is used to set series of DAC's or pots successively, or via gates G-56 and G-53 upon provision of op code 42, which is sued for those series of successive analog-to-digital conversions other than those made by the multiplexer MUX associated with ADC system 36, as indicated by the $\overline{MA}$ signal applied to gate G-56, since the multiplexer, as will be explained below, is capable of rapidly sequencing through those channels which it may address without receiving address information from register IRA. The MA and $\overline{MA}$ signals are derived by a simple decoder 31 connected to register IRA. A further simple decoder 32 responsive to the contents of address section IRA of register 30 provides valid address and nonvalid address signals AVA and $\overline{AVA}$ which indicate whether the address in register section IRA is a proper value which pertains to a terminal intended to be addressed by address selector 37. Decoder 31 constitutes a portion of address selector system 37, which is described in detail in connection with FIG. 3*a*.

During execution of op code 32, when a series of DAC's or pots are being set successively, the output from OR gate G–57 in FIG. 3 is applied to AND gate G–48, and upon the fall of the "execute" E signal, gate G–54 applies a pulse for the time duration of single-shot SS–40 to enable AND gate G–48, thereby providing an incrementing IA signal to register section IRA, which is now connected as a counter, to advance the address in IRA by one count. During execution of op code 34, when a DAC is to be updated at the end of the instruction, the single-shot SS–40 output also will be seen to enable gate G–51, to provide an update signal which is applied via OR gate G–49 to provide an update signal USC following the fall of each "execute" period. The USC signal is routed to control the DAC system as shown in FIG. 4. It will be seen that each successive "execute" signal E will advance the address in IRA by a further count. During execution of op code 42 when nonmultiplexer address terminals are being addressed in succession to be digitized, an output signal from AND gate G–50 applied through OR gate G–57 will be seen similarly to provide an input to gate G–48 so that an address-incrementing pulse IA will be applied to "counter" IRA at the fall of each "execute" (E) signal.

Each IA address-incrementing pulse is also applied, as shown in FIG. 3, to single-shot delay SS–41, to disable gate G–55 for a predetermined time each time an address-incrementing IA pulse is provided out of gate G–48, thereby preventing any analog-to-digital conversion op code from incrementing the address for a short period of time determined by the period of single-shot delay SS–41. This delay insures that any nonvalid address signal $\overline{AVA}$ which may occur will have had time to become fully established before gate G–55 can be enabled to increment the count.

When data is transferred internally within the hybrid computer to set a DAC, as will be explained below in connection with FIG. 4, the data word is applied first to an initial register associated with a given DAC and then to a final register associated with the DAC. During such internal data transfers, the DX2 signal derived as shown in FIG. 1 is applied via OR gate G-54 to single-shot SS-40 to provide a measured pulse from single-shot SS-40 which disables AND gate G-52, thereby delaying the updating of the DAC final register for the time period of single-shot SS-40 while the DAC initial register is being loaded with data from bus 21 (FIG 4)

Figure 2:
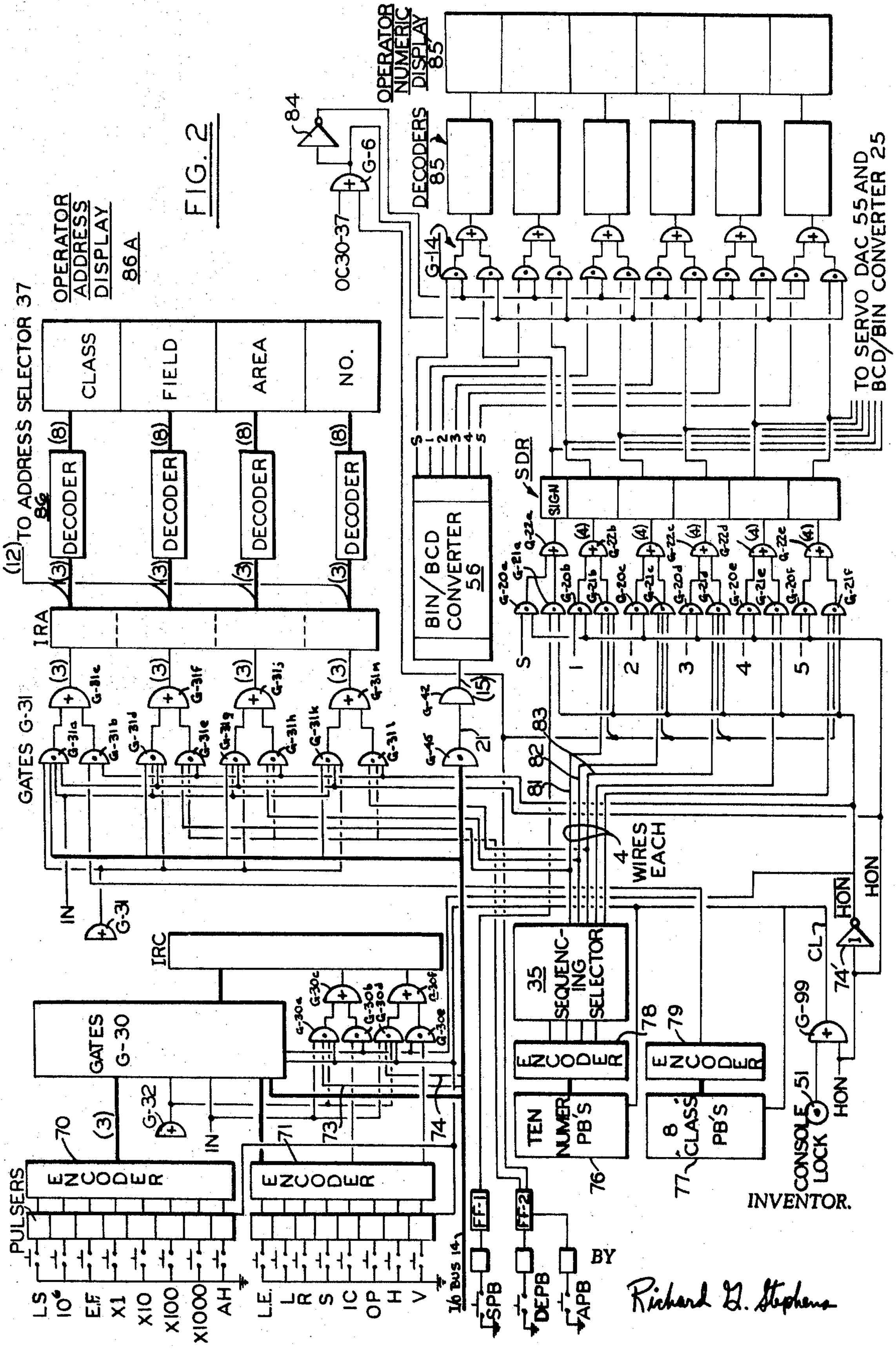
FIG. 2 is a schematic diagram illustrating one manner in which the instruction register of the hybrid computer may be connected to be capable of both digital computer and manual control.

A feature of the invention which greatly increases the utility of the hybrid computer in an economical manner is that instruction and address information may be entered manually into both control section IRC and address section IRA of instruction register 30, except during those times when the digital computer provides a "hybrid on" (HON) signal to disable all of the manual pushbuttons. In FIG. 2 16 control pushbuttons are shown at the left, each being connected through respective pulser (which may comprise a single-shot multivibrator) to an encoder circuit (70 or 71), and the output of each encoder is applied to gate circuit G-30, several portions of which are shown separately in FIG. 2 at G-30*a* through G-30*f*. The state of the eight upper pushbuttons is encoded by encoder 70 to provide a particular one of eight binary numbers on three lines from encoder 70, and encoder 71 similarly encodes the conditions of the other eight pushbuttons to apply output signals to gate circuit G-30. As was shown above in FIG. 3, the occurrence of an IN signal and an output from gate G-32 serves to connect six lines of I/O bus 14 to register IRC. In FIG. 2 line 73 of I/O bus 14 is shown connected to AND gate G-30*a*, and simultaneous occurrence of an output signal from gate G-32, the IN signal, and a "hybrid on" signal will be seen to enable gate G-30 a to connect the signal on wire 73 of I/O bus 14 to one stage of register IRC via OR gate G-30*c*. The occurrence of the same signals will be seen to connect wire 74 of I/O bus 14 to another stage of register IRC via AND gate G-30*d* and OR gate G-30*f*. In the absence of a "hybrid on" signal, however, it will be seen that the $\overline{\text{HON}}$ signal provided from inverter 74 will enable AND gates G-30*b* and G-30*e*, so that pushbutton-generated control signals from encoder 71 may be applied via gate circuits G-30*c* and/or G-30*f* to register IRC. The remainder of the output lines of encoders 70 and 71 are similarly connected to individual stages of register C, to allow pushbutton control of register IRC in the absence of "hybrid on" conditions. As mentioned above, patching a desired signal to the "console lock" patchhole 51 provides a permanent pushbutton disabling signal from gate G-99 for the duration of the desired signal, to prevent pushbutton operation during that time.

Address information may be entered manually into address register IRA by depressing one of eight "class" pushbuttons indicated collectively at 76 to select one of eight classes of terminals, and then by successively depressing three of the numerical pushbuttons indicated collectively at 76 to select the number of the field, the number of the area, and the number of the component, respectively. The terminals which may be addressed by address selector 37 are arbitrarily divided into eight "classes," such as (1) plus amplifier output terminals, (2) minus amplifier output terminals, (3) output terminals of DAC's, (4) potentiometer coefficients, (5) amplifier summing junctions, (6) digital function generator summing junctions, (7) trunk lines connected to holes on analog patchboard 41 and to connectors (not shown) to which external equipment may be connected, and (8) logic elements. The numerical and class pushbuttons are similarly connected through respective pulsers (not shown) to encoders 78 and 79, to convert the "-class" selected into a 3-bit binary number, which is applied as shown to AND gate G-31*b*. Encoder 78 converts each of the three successive numeric pushbutton actuations into a 4 -bit BCD signal, and as the three numeric pushbuttons are successively depressed, sequencing selector 35 successively connects the three 4-bit signals to register IRA through AND gates G-31*e*, G-31*h* and G-31*l*, respectively. For example selector 35 connects the encoder 78 outputs on four wires indicated collectively at 81 to gate circuit G-31*e*, when a first pushbutton of group 76 is depressed, connects the encoder 78 outputs on four wires at 82 to gate circuit G-31*h* when a second pushbutton is depressed, and connects the encoder 78 output via four wires at 83 to gate circuit G-*l* when the third numeric pushbutton is depressed. As shown in FIG. 2, the selector 35 output signals are applied to register IRA through AND circuits (G-31*b*, G-31*e*, G-31*h*, G-31*l*) which also receive the $\overline{\text{HON}}$ signal. Thus during the occurrence of a "hybrid on" condition, the signals on 12 wires of I/O bus 14 will be connected to the 12 stages of register IRA upon the occurrence of an IN signal and an output from gate G-31, as explained in connection with FIG. 3, together with the "hybrid on" signal HON, which is applied to enable AND gates G-31*a*, G-31*d*, G-31*g* and G-31*k*, but in the absence of a "hybrid on" signal, the $\overline{\text{HON}}$ signal enables gates G-31*b*, G-31*e*, G-31 h and G-31*l* to allow a pushbutton entry to be made into address register IRA. The class, field, area and number information in register IRA at any time is connected as shown via four simple decoders 86 to operate the operator's address display 86*a*.

When gate G-45 is enabled to allow DAC's or pots to be set, as will be explained in connection with FIG. 4, the 14-bit numerical word and sign bit data on I/O bus 14 is connected via gate G-42 to binary to binary-coded decimal converter 56 to provide a binary-coded decimal output on wires shown at S and 1 through 5 in FIG. 2. These outputs from converter 56 are applied to AND gates (G-20*a*—*f*) shown just below in FIG. 2, to be connected to servo-DAC register SDR during "-hybrid on" operation, and from register SDR to control the setting of a pot or a DAC of system 24 in a manner to be explained in connection with FIG. 4. However, in the absence of a "hybrid on" condition, it will be seen that the output signals of pushbutton sequencing selector 35 may be instead connected to the servo-DAC register via AND gates (G-21*a*—). "Data Entry" pushbutton DEPB and "Address Entry" pushbutton APB are shown connected through respective pulsers to switch flip-flop FF-2 to one or the other of its two possible states. If the operator depresses "Data Entry" pushbutton DEPB to latch flip-flop FF-2, then switches "Sign" pushbutton SPB to select a + or a −, to latch flip-flop FF-1 in a selected one of its two states, it will be seen that a sign bit will be registered in servo-DAC register SDR, and as five numeric pushbuttons then are successively depressed, sequencing selector 35 will sequentially connect each decoded pushbutton number (via 4 wires) to one of the five further BCD sections of servo-DAC register SDR. During such a manual data entry, or during any potentiometer or DAC setting operation (op code OC30—OC37), it will be seen that an output signal from OR gate G-6 will enable a set of gates of group G-14 so as to connect the contents of servo-DAC register SDR through decoders 85 to actuate the operator's numeric display 85′, to indicate the sign and five decimal-digit value contained in register SDR. At all other times it will be seen that the inverted signal from inverter 84 will instead cause the signal in the BCD register of BIN/BCD converter 56 to be displayed.

The contents of address section IRA of instruction register 30 are connected to address selector system and then routed throughout the hybrid computer in a manner which will become more apparent from FIG. 3*a*. Address selector 37 comprises a number of decoder circuits (37*a* to 37*h*) which decode the address in register section IRA to energize one of a large number of output lines to connect a selected terminal to either a voltage bus VB or a current bus IB, and further decoders (31 and 32) which provide logic signals (1) indicating by means of an AVA or an $\overline{\text{AVA}}$ signal whether the number in IRA represents a terminal intended to be addressed by address selector 37, and (2) indicating by means of an MA or $\overline{\text{MA}}$ signal whether the number in register section IRA pertains to a different group of terminals which are addressable only by a high-speed multiplexer MUX of the analog-to-digital converter system 36.

Depression of a given one of the eight "class" pushbuttons (77 in FIG. 1) and depression of three successive numeric pushbuttons of group 76 to provide a particular address in register IRA (or provision of a word in IRA from digital computer 10) results in one of a possible 4096 output lines from address selector 37 being energized, and if a component has been connected to the particular line energized, in an AVA signal from decoder 32 portion of address selector 37. Depression of the "+amplifier" class pushbutton, and then number pushbuttons "2," "3" and "4" in succession, for example, results in the energization of the one output line of decoder 37*a* which connects to a relay K-234 at the positive output terminal of operational amplifier A-234. The component terminals of any given class, such as positive amplifier output terminals, are preferably successively subdivided into "fields," "areas" and "numbers," so that depression of numeric pushbuttons "2", "3" and "4" after depression of the class pushbutton operates to energize a relay associated with a plus amplifier terminal in the second field, the third area, and the fourth such amplifier terminal in that area.

Certain of the terminals addressable by system 37 are voltage-producing terminals, while others are current-producing terminals. Amplifier output terminals carry voltages, and hence energization of relay K–234 in the above example connects the output terminal of the amplifier to voltage bus VB. The DAC's, however, provide output currents, and hence if a class 3 pushbutton were instead depressed to provide an output from decoder section 37*c*, energization of relay M–234 would connect the output terminal of DAC D–234 to current bus IB. It will be seen that voltages applied to voltage bus VB are connected to operational amplifier ASV through an input resistance R–VC but that currents connected to current bus IB are applied directly to the summing junction of operational amplifier ASI and hence converted to voltages. Energization of the relay associated with a voltage-producing terminal also provides an enabling signal on logic line IV to transfer relay IVR, so that output line ASO of address selector 37 is connected to the output of amplifier ASV, while addressing of a current-producing terminal connects line ASO to the output of amplifier ASI. Thus it will be seen that an output voltage proportional to either the voltage of current at the addressed terminal is made present on output line ASO of address selector 37, and as will be seen below in connection with FIG. 6, the ASO output line is routed to ADC converter 36, where the voltage will be digitized.

The manner in which digital words from I/O bus 14 may be applied to the coefficient potentiometer system 26 and the DAC system 24 may be better understood from reference to FIG. 4. Both the DAC system and the pot system are connected to I/O bus 14 through bus 21 and a 16-bit AND gate circuit G–45. As may be seen from Table I, op code 31 is used to apply input words from digital computer 10 to both pot system 26 and DAC system 24. The simultaneous occurrence of op code 31 and an IN signal through OR gates G–46 and G–47, respectively, will be seen to connect the signals on I/O bus 14 through gate circuit G–45 to pot-DAC bus 21 to be routed to whichever DAC or pot is being addressed by address selector 37 in accordance with the contents of register section IRA. It may be noted that the DX2 signal is also capable of enabling gate circuit G–45 to accomplish internal data transfers within the hybrid computer to set a DAC or a pot, one source of such data being the output of ADC system 36 shown in FIG. 1. Such internal data transfers are made by first addressing a particular DAC or a pot from address selector 37, and simultaneously providing a DX2 data transfer signal (by patching logic signals to lines 120 and 121 in FIG. 1), thereby enabling gate G–72 to read out the contents of the ADC onto I/O bus 14 as will be explained below in connection with FIG. 6. The DX2 signal then enables gate circuit G–45 to connect the signals on I/O bus 14 through bus 21 to the selected DAC or pot in the manner described above.

The DAC's of system 24 may comprise conventional resistance networks each connected to convert the contents of a respective "final register" to an analog current signal. In order that all of the analog voltages generated by a plurality of DAC's may be updated simultaneously even though digital signals are applied successively to the individual DAC's, each DAC is provided with both an "initial register" and a "final register," so that new data may be written sequentially into the initial registers of many DAC's while previously written data continues to be converted, and then a group of DAC's may be updated simultaneously, as will be seen, by transferring their respective initial register contents to their respective final registers all at the same time by means of the USC signal derived as shown in FIG. 3. Op code 34 is used to update a group of DAC's at the end of the instruction. The fall of the "execute" (E) pulse will be seen to provide an output from OR gate G–54 in FIG. 3, thereby providing a measured pulse from single-shot SS–40 through AND gate G–51 and OR gate G–49, providing the USC signal to the group of DAC's shown in FIG. 4.

The total number of DAC's provided in the hybrid console preferably are divided into groups of eight or 16, and FIG. 4 illustrates the manner in which a single group of eight DAC's may be controlled, Each DAC is identified by a particular address. A data word on I/O bus 14 may be written into the initial register of any selected DAC by providing the selected DAC address in IRA to control address selector 37 and providing op code 31 and the IN signal to enable gate G–45 in the manner described above. A 2-bit DAC update register is provided for each group of DAC's which one may desire to update simultaneously, a single one of such registers being shown at DUR in FIG. 4. The provision of an op code 02 signal from operation register 50, and simultaneous provision of a DAC group address from register IRA applied via address selector system 37 enables gate circuit G–65 and connects two lines of I/O bus 14 to DAC update register DUR. Writing a "11" in register DUR allows the DAC's of that group all to be updated immediately upon subsequent provision of an op code 30. The contents of register DUR are decoded by decoder URD, and the "11" line from decoder URD, together with op code 30 and an "access" or A signal to enable gate G–61 also enable gate G–62, thereby applying an update signal via OR gate G–63 to enable gates G–150, G–151, etc., which connect the initial registers of that group of DAC's to their associated final registers. Thus it will be seen that the group of DAC's will be updated immediately during the "access" or A signal from address register 46, without waiting for a subsequent "execute" E signal period.

Provision of an "00," an "01" or a "10" signal in register DUR instead results in the DAC's of the group not being updated by op code 30, but instead selectively, by means of signals from the logic patchboard. For example, provision of "00" signal in register DUR will result in DAC's of the group being updated whenever a logic signal patched to hole UD00 occurs, and provision of an "01" in register DUR allows the signal patched to hole UD01 to control the time at which the DAC's of the group are updated. However, if a given DAC is addressed by register IRA and an op code 34 signal is provided, it will be seen that the gates for that particular DAC will be enabled immediately, irrespective of the state of DAC update register DUR, upon receipt of the USC signal. Provision of the DAC-0 address, for example, in register IRA and op code 34 results in gates G–149 and G–150 being enabled, and receipt of the USC signal then results in immediate connection of the 16-bit word on bus 21 through gate G–60 and through the DAC-0 initial register and gate G–150 to the DAC-0 final register. It will be seen that the contents of group DAC update register DUR may be read out and placed on two lines of I/O bus 14 by provision of an op code 03 signal and the DAC group address to enable gate G–64 to connect the contents of register DUR to two lines of I/O bus 14. The ability to read out the contents of register DUR is useful when a problem set up on the hybrid computer is to be removed but it may be wished that the same problem be set up again at some later time.

When a DAC is to be set manually rather than from digital computer 10, the "Address Entry" pushbutton APB of FIG. 2*a* is depressed, and a class pushbutton of group 77 and successive numeric pushbuttons of group 76 are depressed to enter the desired DAC address in section IRA of instruction register 30. Then "Data Entry" pushbutton DEPB is depressed and a plurality of numeric pushbuttons depressed to enter the desired DAC setting via gates G–21a—and G–22 a-—fin BCD-coded servo-DAC register SDR. As shown in FIG. 4, the output of servo-DAC register SDR is connected to a BCD-to-binary converter 25 to be converted to binary form and then connected via gate G–42' to whichever DAC has been addressed.

When data on I/O bus 14 is to be routed to set a potentiometer rather than a DAC, a potentiometer address rather than a DAC address is placed in address register IRA. The register IRA contents are decoded by pot address decoder 37d, which is a portion of address selector system 37, to select a single pot at one time, such as pot R–1 or pot R–2 shown in FIG. 4. The addressing of a given pot results in closure of the switches associated with it, to apply the output of servo amplifier SA to its respective servomotor M to connect the upper terminal of the selected pot to a source of reference voltage, and to connect the wiper arm of the selected pot to line 120. The pot address in register IRA enables gate G–142 to apply the data word on pot-DAC bus 21 to binary to binary-coded decimal converter 56. The 16-bit data word connected by gate G-45 during execution of an op code 31 to pot-DAC bus 21 is converted from binary form to binary-coded decimal form by BIN/BCD converter 56 and applied to servo-DAC register SDR. The contents of register SDR are converted by a conventional BCD-coded DAC 55 from BCD form to an analog current corresponding to the desired potentiometer setting. The analog current is applied to the conventional servoamplifier SA, which drives the motor M of the addressed pot until the feedback current in line 120 is equal and opposite to the input current from the servo-DAC to provide a null. While the potentiometer is being adjusted, a "flag" signal PS is provided by timer T–4 and applied to one wire of status bus 34 (FIG. 1), and if a potentiometer which has been addressed has failed to null by the end of two seconds time, another flag signal PF provided by comparator 57 continues to be applied to another wire of status bus 34. If a "0" bit (indicated by $\overline{B1}$) is present in bit-space 1 of control section IRC of register 30, it will be seen that a further relay (such as SPR–1) associated with the addressed pot will be energized, thereby connecting the top of the addressed pot to the source of reference voltage mentioned above.

If a "1" bit (indicated by $\overline{B1}$) is present in bit-space 1 of control section IRC of register 30, it will be seen that relay SPR–1 associated with the addressed pot will be deenergized, thereby connecting the top of the addressed pot to the patchboard, so that the potentiometer output value may be read out through the address selector system 37 via the IB line 120 as described above in connection with FIG. 3a.

It frequently is desired that a large group of DAC's or pots be set in a lengthy sequence, and to obviate the need for writing a program step for each DAC and/or pot, op code 32 is provided to allow the address in instruction register IRA to be incremented automatically to successive addresses, by reconnecting the stages of register IRA to the binary counter configuration and advancing the count at the end of each instruction, as was explained above in connection with FIG. 3, and as was previously mentioned, such reconnection of register IRA is also used during execution of op code 42 to allow automatic address incrementing to perform a series of analog-to-digital conversions, as will be explained below in connection with FIG. 6.

The manner in which input data words are connected from I/O bus 14 to the control line registers of system 28 will be clear from reference to FIG. 5. I/0 bus 14 is connected through eight 16-bit gate circuits to the eight 16-bit control line registers, only the first gate circuit G-60 and last gate circuit G–67 of each group of gates, and only the first (No. 0) and last (No. 7) of the eight control line registers being shown in FIG. 5. Words are written into any one of the eight control-line registers from digital computer 10 by providing the appropriate one of the eight op codes (OC50—OC57) in register 50, and during the occurrence of the HON signal the output of gate G–68a is applied via OR gate G–68b to AND gate G–68c. Upon occurrence of the IN signal, the output of gate G–68c is applied to the particular one of the control line registers selected by the particular op code in register 50. For example, an op code OC57 signal connects the I/O bus signal to control-line register No. 7. Each of the control-line register bits are connected to respective holes on the hybrid computer logic patchboard, from where they may be patched for a wide variety of purposes. During the execution of any one of the eight control-line op codes, gate G-69 provides an "inhibit" signal which is used to inhibit output gates (G–60a, G–67a) at all of the control line registers, to prevent the contents of any control line register from being read while they are being written.

Words are read out of any one of the eight sense-line registers of FIG. 5 and connected to digital computer 10 by providing an appropriate op code (of the series OC60 to OC67) in operation register 50, which op code is applied to gate G–88a, and during the occurrence of the HON signal the output of gate G–88a is applied via OR gate G–88b to gate G–88c. Upon occurrence of an OUT signal from OR gate G–88d, the output of gate G–88c connects the contents of the selected sense-line register to I/O bus 14 through a respective gate circuit, such as G–80 or G–87, for example. Simultaneously, gate G–89, which receives the op code signal and the "execute" signal E, provides an inhibit signal which is connected to input gates (e.g. G–80a, G–87a) at each sense-line register to prevent the sense-line register contents from changing while they are being read, even though various of the input signals patched to the sense-line registers may change during that time.

As well as connecting digital computer inputs into the control-line registers and connecting sense-line register contents out to the digital computer, the apparatus of FIG. 5 may be used to make internal transfers of sense-line register contents into control-line registers. Such transfers are made by first providing an op code signal of the OC60 to OC67 series to select the particular sense-line register to the read, and simultaneously providing a DX3 data transfer signal (by patching logic signals to lines 120 and 122 in FIG. 1), thereby enabling gate G–88c in FIG. 5 to read out the contents of the addressed sense-line register onto I/O bus 14, and simultaneously enabling gate G–90a to route the sense-line register contents into temporary storage register 90. Then by providing an op code of the OC50—OC57 series as the next instruction to select a particular control-line register, the contents of the temporary storage register 90 will be transferred via gate G–90b onto I/O bus 14 and to the selected control-line register by a DX4 data transfer signal. As seen in FIG. 1, the DX4 data transfer signal is generated by patching logic signals simultaneously to lines 120, and 123, thereby enabling gate G–122 to provide signal DX4.

In order to allow both the sense-line registers and the control-line registers to be addressed manually, the contents of address section IRA of instruction register 30 are decoded by section 37h of address selector 37 and applied to AND gate circuits G–68e and G-88e together with the $\overline{HON}$ signal, and hence in the absence of a "hybrid on" condition, pushbutton entries into register section IRA may be made to address either a sense-line register or a control-line register.

The manner in which the contents of the status bus 34 and the interrupt register group 40 are transferred out to the digital computer may be understood by reference to FIG. 7. A plurality of lines carrying various error and "flag" conditions are connected to the various wires of status bus 34, only two such lines 65, 66 being shown in FIG. 7. As seen in Table I, op codes 00 and 01 are used to read out the status bus. As seen in FIG. 7, these op code signals are each applied through OR gate G–98 to enable gate circuit G–91 when an OUT signal occurs, thereby connecting the contents of status bus 34 to I/O bus 14. Derivation of the OUT signal was shown and explained above in connection with FIG. 3. While the error and flag signals applied to lines of bus 34 may change at any time, bus 34 is provided with input gates G-99 which prevent the lines of bus 34 from changing state except curing the time of an enabling signal from AND gate G-92. The output signal from OR gate G-98 is inverted and applied to gate G-92, and thus the input gates to status bus 34 are inhibited during the time bus 34 is connected to I/O bus 14, and are enabled only when the status bus is not being read out, when the "output enable" signal OE is low.

The interrupt registers of group 40 each are provided with a logic patchhole for each of their stages, only a few such patchholes being shown in FIG. 7. As shown in Table I op codes 70—77 are used to read out the eight interrupt registers. Upon occurrence of a particular one of the eight interrupt register op codes and a simultaneous OUT G-63 gate G-93 connects the contents of the particular register identified by the OP code to I/O bus 14. The interrupt registers are also provided with input circuit gating (not shown) similar to that of the control-line and sense-line registers so that these registers may be updated only when enabled by the output signal of gate G-94. In addition to an $\overline{OE}$ signal, which insures that other data is not being read out onto bus 14, and in addition to an $\overline{OC7X}$ signal, which insures that data is not being read out of any interrupt register, the application of any patchhole signal to change any interrupt register stage requires a logic clock signal LC, so that the interrupt registers may be updated only during times that the data in an interrupt register is not being read out. The logic clock signal LC is provided by the clock pulse source (not shown) which times all of the logic circuitry within the hybrid computer. Various of the interrupt register stages may be AC-coupled to the sources of the error or flag condition sources which set them, while others may be direct coupled. In FIG. 7 interrupt register stage No. 7 is shown direct-coupled to one patchhole and capacitor-coupled to another. Those register stages which are not direct-coupled to error or flag condition signal sources must be cleared or reset after their contents have been read out. Accordingly, the interrupt register read out op codes OC7X and an OUT signal delayed by single-shot delay circuit SS-7 are combined reset gate G-97 to provide a "clear" signal to reset or clear stage No. 7 a predetermined time after gate G-93 has read out the interrupt register contents. The contents of all of the interrupt registers are also OR'd together at OR gate G-95 to provide a single interrupt signal, which is also clocked by the logic clock signal LC and applied to AND gate G-96, to provide the interrupt signal on interrupt line 90 (one of the discrete control lines of group 18, FIG. 1) to digital computer 10.

The ADC system shown in FIG. 6 is used to convert analog values selected either by the hybrid computer pushbutton address selector system 37 or analog inputs switched into the ADC system through a high-speed multiplexer MUX. The multiplexer of an exemplary ADC system includes 32 selectively closed switches and a sample-hold amplifier, and connects to a high-speed analog-to-digital converter ADC. The multiplexer-converter may comprise, for example, Raytheon Model No. ADC21-15-15B or Model No. ADC200-15-15B. The 32 switches of the multiplexer are each connected to a respective hole on the analog patchboard 41. One group (e.g. 128) of the lines addressable by address selector 37 are preferably routed as "trunk lines" to holes on analog patchboard 41 and to connectors (not shown) to which external equipment may be connected, while other groups of lines which are addressable by address selector 37 are connected within the hybrid computer to specific terminals of specific computing elements as mentioned above. The addressable terminals may be broken down into eight "classes" as mentioned above in connection with FIGS. 2*a*, 2*b* and 3*a*. The analog circuits preferably are also grouped into four "fields" corresponding to four areas into which the analog patchboard is divided, each of the four fields is subdivided into eight areas, so that each area contains up to eight component terminals, each of a different "class," which may be addressed. The particular analog value which is to be converted at any time is determined by the address contained in address section IRA of instruction register 30, except during one mode of multiplexer operation, during which the multiplexer sequences through its 32 switch positions irrespective of the address in register IRA. One group (32) of addresses select respective ones of the 32 lines which are addressable by the multiplexer, while other addresses correspond to those terminals addressable by address selector 37. If numbers are entered into IRA which pertain neither to terminals addressable by the multiplexer nor to terminals addressable by the address selector, a "nonvalid address" signal $\overline{VA}$ is generated by decoder 32 as mentioned above in connection with FIGS. 3 and 3*a*. Provision of an address in register IRA corresponding to one of the 32 multiplexer addresses provides a "multiplexer address" signal (MA) from decoder 31 in FIG. 3. Connection of the contents of register IRA through decoder sections 31 and 32 of selector 37 (FIGS. 3 and 3*a*) to provide the $\overline{VA}$ and the MA signals and their complements is straightforward and needs no detailed explanation.

If the address applied to multiplexer MUX is not a multiplexer address, the $\overline{MA}$ signal transfers electronic switch S-100 (shown as a simple relay in FIG. 6 for sake of simplicity) so that the address selector 37 output line ASO is connected to converter ADC, to convert the analog signal selected by the address selector. If, on the other hand, the address in register IRA is one of the 32 multiplexer addresses, electronic switch S-100 remains in the position shown in FIG. 6.

The multiplexer-ADC converter is capable of operating in three different modes, including (1) a "digitize" mode in which the converter repetitively converts whatever analog signal is being addressed, (2) a "random" mode in which the converter converts the value then addressed upon receipt of a "convert" command and then stops, and (3) a "sequential" mode, in which the multiplexer is stepped to the next one of its switch positions, converts the value sampled upon receipt of a "convert" command, and then stops.

As may be seen from Table I, op code 41 is used to cause the converted output from converter ADC to be read out when op code 41 is executed, execution of op code 42 results in the address in register IRA being incremented, and execution of op code 44 initiates an analog-to-digital conversion. Op code 45 (which equals in effect both op code 41 and op code 44) will be seen to provide both initiation on of a conversion and a readout. Op code 47 (which equals in effect the operations of op code 41, and op code 42, and op code 44) will be seen to provide initiation of a conversion, incrementing of the address to advance the multiplexer to its next position, and readout of the converted value. In FIG. 6, the multiplexer is placed in the "random" mode or the "sequential" mode by inputs from gate G-108 or gate G-109, respectively, and if neither the "sequential" signal S nor the "random" signal RA is applied to the multiplexer-converter it operates in its repetitive "digitize" mode.

In order to read out the converted value from the ADC system, op code 41 is applied to OR gate G-73, and upon occurrence of an OUT signal through gate G-74, AND gate circuit G-72 is enabled to connect the ADC output word to I/O bus 14. During internal data transfers, the DX2 signal may be seen to operate to similarly apply the converted value to I/O bus 14.

When an op code 42 is provided to establish "sequential" operation, and a multiplexer address exists in register IRA, the "sequential" signal S output from gate G-109 puts multiplexer MUX in its sequential mode. At the end of the "execute" signal, an output will be seen to be provided from gate G-102, to provide an output pulse from single-shot SS-101 via OR gate G-103 to AND gate G-106. The existence at that time of a valid multiplexer address signal MVA from multiplexer MUX and the conversion initiation op code 44 applied to gate G-106 provide an output from OR gate G-105, to provide in turn a "convert" pulse from single-shot SS-102. The convert pulse is applied to multiplexer MUX to advance it to the next one of its 32 switch positions, and after a short delay the same "convert" pulse causes converter ADC to begin converting the signal held in sample-hold amplifier A–100. When the analog value has been converted, converter ADC provides an "end of conversion" signal (EOC). If the op code in register 50 includes op code 41, the converted value can then be read out upon occurrence of the next "execute" E signal from address register 46 in the manner described above. The "end of conversion" signal from the ADC converter is applied to digital computer 10 over one of the discrete control lines of group 18. The digital computer then may provide an "output enable" OE signal, which will result in an OUT pulse, to read out the converted value. The fall of the E "execute" signal then provides an output via gate G–102 to initiate a timed pulse from single-shot SS–101, which is applied via gates G–103, G–106 and G–105 to provide a further "convert" pulse from single-shot SS–102 to repeat the cycle.

With a proper multiplexer address in register IRA, and without the incrementing op code 42 applied to gate G-202, the $\overline{S}$ input to gate G-108 applied the "random" control signal RA to multiplexer MUX. The multiplexer address in register IRA is decoded by decoder 160 and applied to close the addressed multiplexer switch, thereby connecting the addressed multiplexer line to sample-hold amplifier A–100. With the conversion initiation op code 44 applied directly to gate G-104 and a multiplexer valid address signal MVA applied to gate G-104 via OR gate G-116, the fall of either the A "access" pulse or the E "execute" pulse from digital computer 10 will be seen to apply a pulse from single-shot SS-103 to enable gate G-104, providing a signal via OR gate G-105 to single-shot SS-102 to provide the "convert" pulse to the multiplexer MUX and converter ADC. When the address in register IRA is not a multiplexer address but that of a terminal addressable by the address selector, the "convert" signal is derived in similar fashion, but by virtue of the AVA input applied to gate G-116 rather than the MVA signal as before.

To provide sequential conversion of voltages on terminals addressable by address selector 37, the address incrementing op code 42 is applied to AND gate G-56, and due to the then absence of a multiplexer address, or $\overline{MA}$ signal, the output signal from gate G-56 is applied via OR gate G-53 to provide a CA signal to register IRA, to reconnect the stages of register IRA into its binary counter configuration. As was shown in connection with FIG. 3, the op code 42 and $\overline{MA}$ signal also enable AND gate G-50 and apply a signal via OR gate G–57 and AND gate G–48, thereby applying an IA incrementing pulse to register IRA, to advance it one count to the next address.

A variety of processes must not be disturbed or interrupted by operator actions, and to prevent pushbutton or logic patchboard changes by the operator from interrupting such processes, the "hybrid on" signal previously mentioned is applied to "lock out" the manual control panel. As may be seen in FIG. 6, an output signal will be applied to OR gate G–125 via gates G–56 and G–53 during automatic sequencing of the address selector with op code 42, or via gate G-53 while DAC's or pots are being set up sequentially with op code 32, or via gate G-110 either if any DAC or potentiometer is being set or if an analog-to-digital conversion is being initiated, or via gate G-103 during analog-to-digital conversions, whether of multiplexer addresses or address selector addresses, by virtue of output signals from gates G–102 or G–107, or during the occurrence of any "access" period (A signal period) while data is being transferred from the digital computer, by virtue of an output signal from OR gate G–111, or during any "execute" period (E signal period), while any valid operation code instruction is being executed, by virtue of an output signal from AND gate G–112.

During any of the above-listed conditions the output signal from OR gate G–125 is applied to AND gate G–126, and thus it will be seen that any of the conditions will provide a "hybrid on" signal HON to prevent manual pushbutton disruption of computation if an access signal $\overline{BU}$ is also applied to AND gate G–126 from OR gate G–127. By placing switch S–1 in its "off" position the operator may prevent digital computer control of the hybrid computer console and provide a busy signal BU to the digital computer on one of the status bus lines. By placing switch S–1 in its "Hybrid" position, the operator may place the hybrid computer primarily under control of the digital computer, so that manual pushbutton control of the hybrid computer is prevented during the occurrence of any one of the above-listed conditions but effective other than during occurrence of the mentioned conditions. Thirdly, by patching a logic signal to a "Hybrid Enable" patchhole HE, the position of switch S–1 may be rendered immaterial, so that the logic signal patched to hole HE overrides the effect of switch S–1. The HE hole is connected both directly to AND gate G–130 and through an inverting emitter-follower overriding circuit EF–1, to provide a logic "0" output signal from gate G–130 if nothing is patched to hole HE, but to provide a logic "1" output signal from gate G-130 if either a logic "1" or a logic "0" signal is patched to hole HE.

With switch S–1 placed in its "off" position and with no signal patched to hole HE, it will be seen that logic "1" signals are applied to AND gate G–128 from both switch S–1 and from AND gate G–130, thereby enabling AND gate G–128 and providing a busy signal BU. Under these conditions both gates G–129 and G–131 will be seen to be disabled, so that no $\overline{BU}$ signal will be provided from OR gate G–127 to AND gate G–126. With switch S–1 in its "off" position, but with a logic signal patched to hole HE so that a logic "1" signal is provided by gate G–130 to gates G–131 and G–132, it will be seen that gate G–131 will be enabled to provide a $\overline{BU}$ signal output from gate G–127 when the patched logic signal is "1," and that gate G–132 will be enabled to provide a BU signal output from gate G–133 when the patched logic signal is "0," the output signal from hole HE being inverted by inverter I–121 and applied to AND gate G–132. With switch S–1 in its "HY" position and nothing patched to hole HE, it will be seen that a logic "1" signal from switch S–1 will enable gate G–129 to provide a $\overline{BU}$ signal G–127 gate G–127 and that gates G–128, G–131 and G–132 will be disabled. If a logic signal is patched to hole HE, however, so that a "1" output is provided from gate G–130, it will be seen again G–131 gate G-131 will be enabled when the patched logic signal is "1" to provide a $\overline{BU}$ output from gate G–127, and that gate G–132 will be enabled when the patched logic signal is "0" to provide a BU output from gate G–133. The HON signal output from OR gate G–125, and its complement $\overline{HON}$ from inverter 74′ are routed to various systems as previously described.

The embodiments of the invention in which an exclusive property or privilege is claimed are defined as follows:

1. Hybrid analog-digital computer apparatus connected to be operable in conjunction with a digital computer, comprising, in combination:

first register means connected to be addressed by said digital computer to provide first and second signals; and input-output bus comprising a plurality of lines connected to data input and output lines of said digital computer; second register means; firs gating circuit means operable in response to said first signal to connect said input-output bus to said second register means; first decoder means operable to decode the contents of said second register means to provide an operation code signal on one or more of a plurality of lines to specify one or more operations to be performed within said hybrid computer apparatus; third register means; second gating circuit means responsive to said second signal, to an enabling signal from said digital computer and to selected ones of said operation code signals and operative to connect a plurality of stages of said third register means to said input-output bus; and further computer apparatus including a plurality of analog computer elements connected to be addressed by and have their operating modes controlled by the contents of said third register means.

2. Apparatus according to claim 1 having a plurality of manual controls encoder means responsive to operation of said manual controls for applying signals via said second gating circuit to said third register means; and third gating circuit means responsive to occurrence of said first signal or certain of said operation code signals for providing an inhibiting signal to prevent the operation of said manual controls from altering the contents of said third register means.

3. Apparatus according to claim 1 in which said analog computer elements include a plurality of digital-to-analog converters; third gating circuit means responsive to one of said operation code signals, said second signal, and to said enabling signal; and fourth gating circuit means responsive to the contents of a portion of said third register means, said third and fourth gating circuit means being operable to connect said input-output bus to a selected one of said digital-to-analog converters in accordance with said contents of said portion of said third register means.

4. Apparatus according to claim 1 in which said analog computer elements include a plurality of servo-positioned potentiometers; digital code conversion means; digital-to-analog converter means operative to convert the output of said code conversion means to an analog signal; third gating circuit means responsive to one of said operation code signals, to said second signal, and to said enabling signal, and operative to connect said input-output bus to said digital code conversion means; and selective switching means responsive to the contents of a portion of said third register means for connecting said analog signal to adjust a selected one of said potentiometers in accordance with said contents of said portion of said third register means.

5. Apparatus according to claim 1 in which said analog computer elements include an analog-to-digital converter means; third gating circuit means responsive to one of said operation code signals, to said second signal, and to said enabling signal, and operative to connect the output of said analog-to-digital converter means to said input-output bus; selective switching means for connecting a selected analog signal as an input to said analog-to-digital converter means; and means responsive to the contents of a portion of said third register means for controlling said selective switching means.

6. Apparatus according to claim 1 in which said further computer apparatus includes an analog-to-digital converter operative to convert analog signals from a plurality of said analog computer elements to digital signals and operative to provide a control signal while said converter is converting a given one of said analog signals; and third gating circuit means responsive to one of said operation code signals and to said control signal to prevent the application of said enabling signal to said second gating circuit means while said converter is converting one of said analog signals.

7. Apparatus according to claim 1 having switching means operable in response to one of said operation code signals to reconnect a portion of said third register means into a counter circuit configuration; and third gating circuit means responsive to said one of said operation code signals and to said second signal and operative to apply an incrementing pulse to advance the count in said portion of said third register means.

8. Apparatus according to claim 1 in which said analog computer elements include a plurality of analog electronic integrators, and in which said apparatus includes switching means responsive to the contents of a portion of said third register means and operable to connect said integrators to operate with a selected time scale, and to switch between operating, resetting and holding modes in accordance with said contents of said portion of said third register means.

9. Apparatus according to claim 1 in which said further computer apparatus includes a patchboard having groups of patchholes; a plurality of control-line registers, third gating circuit means for connecting the contents of each of said control-line registers to a respective group of said patchholes; fourth gating means responsive to one of said operation code signals, to said second signal and to said enabling signal and operative to connect said input-output bus to a selected one of said control-line registers; and fifth gating circuit means responsive to said one of said operation code signals and to said second signal and operable to apply an inhibiting signal to said third gating circuit means to prevent the signals at said group of patchholes from changing during the duration of said second signal.

10. Apparatus according to claim 1 in which said further computer apparatus includes a patchboard having groups of patchholes; a plurality of sense-line registers; third gating circuit means for connecting each group of said patchholes to a respective one of said sense-line registers; fourth gating circuit means responsive to one of said operation code signals, to said second signal and to said enabling signal, and operative to connect the contents of a selected one of said sense-line registers to said input-output bus; and fifth gating circuit means responsive to said one of said operation code signals and to said second signal and operable to apply an inhibiting signal to said third gating circuit means, to prevent the signals at said group of patchholes from changing the contents of said selected one of said sense-line registers during the duration of said second signal.

11. Apparatus according to claim 1 having a third gating circuit responsive to a fourth signal and in which said input-output bus is connected to said data input and output lines of said digital computer through said third gating circuit, said further computer apparatus including a patchboard having a patchhole to which logic signals may be selectively patched; and circuit means for connecting said patchhole to provide said fourth signal to said third gating circuit to disconnect said input-output bus from the input and output lines of said digital computer.

12. Apparatus according to claim 1 in which said second gating circuit means is operative in response to said second signal, a first one of said operation code signals and to a first enabling signal from said digital computer to apply data signals from said digital computer over said input-output bus to write said data signals in a plurality of stages of said third register means, and in which said second gating circuit means is operative to response to said second signal, a second one of said operation code signals and to a second enabling signal from said digital computer to read out the contents of a plurality of stages of said third register means over said input-output bus to said digital computer.

13. Apparatus according to claim 1 in which said further computer apparatus includes a plurality of synchronous logic circuits timed by a clock pulse source; a plurality of interrupt register stages; a patchboard having a plurality of patchholes; and third gating circuit means operative in the absence of said enabling signal, curing one level of said timing pulses from said clock pulse source, and in the absence of a selected one of said operation code signals for connecting said patchholes to respective ones of said interrupt register stages.

14. Apparatus according to claim 1 in which said third register means has a greater bit capacity than the number of lines of said input-output bus; third gating circuit means responsive to said selected ones of said operation code signals and to said enabling signals for providing a timed signal, said timed signal being connected to said second gating circuit means to cause said input-output bus to be connected successively to first and second portions of said third register means.

15. Apparatus according to claim 1 in which said further computer apparatus includes patchboard means having a plurality of patchholes; a plurality of sense-line registers; third gating circuit means for connecting a respective group of said patchholes to each of said sense-line registers; fourth gating circuit means responsive to a first one of said operation code signals, to said second signal and to a first enabling signal from said digital computer and operative to connect the contents of a selected one of said sense-line registers to said input-output bus; a temporary storage register; 50 gating circuit means operative to connect signals on said input-output bus into said temporary storage register; sixth gating circuit means operative to connect data stored in said temporary storage register to said input-output bus; a plurality of control-line registers; seventh gating circuit means for connecting a respective group of said patchholes to each of said control line registers; eighth gating circuit means responsive to a second one of said operation code signals, to said second signal and to a second enabling signal from said digital computer and operative to connect the signal on said input-output bus to a selected one of said control-line registers, means for deriving a first data transfer signal in synchronism with said first one of said operation code signals, a first occurrence of said second signal and a first occurrence of said first enabling signal to enable said fifth gating circuit means to transfer the contents of said selected one of said sense-line registers via said input-output bus into said temporary storage register, and for deriving a succeeding second data transfer signal in synchronism with said second one of said operation code signals, a second occurrence of said second signal and said second enabling signal to enable said sixth gating circuit means to transfer the contents of said temporary storage register via said input-output bus to said selected one of said control-line registers.

16. Apparatus according to claim 3 in which each of said digital-to-analog converters includes an initial register means and a final register means and fifth gating circuit means operable in response to a second of said operation code signals and said first signal to connect the contents of each of the initial register means, said third and fourth gating circuit means being operable to connect said input-output bus to the initial register means of said selected one of said digital-to-analog converters, and each of said digital-to-analog converters being operable to convert the contents of its respective final register means to provide a respective analog signal.

17. Apparatus according to claim 5 having fourth gating circuit means responsive to said operation code signal to control said selective switching means to advance sequentially to connect a series of analog signals in a predetermined sequence to said analog-to-digital converter means upon the occurrence of successive ones of said second signals, irrespective of the contents of said portion of said third register means.

18. Apparatus according to claim 5 having fourth gating circuit means responsive to said first and second signals and to said one of said operation code signals for applying a control pulse to said analog-to-digital converter means to initiate conversion of said selected analog signal by said analog-to-digital converter means.

19. Apparatus according to claim 13 having fourth gating means connected to said plurality of interrupt register stages and enabled by the opposite level of said timing pulses for applying an output signal to said digital computer whenever one or more of said stages have been set by the signals applied to their respective patchholes.

20. Apparatus according to claim 13 in which said plurality of interrupt register stages are AC-coupled via said third gating circuit means to said patchholes; and means including a fourth gating circuit and time-delay means responsive to said selected one of said operation code signals and said enabling signal for applying a signal to reset said stages to a reference condition a predetermined time after said stages have been connected to said input-output bus.

21. Apparatus according to claim 3 having a fourth register means; sixth gating circuit means responsive to a selected one of said operation code signals and to the contents of a portion of said third register means and operable to connect a plurality of the lines of said input-output bus to said fourth register means; and further gating circuit means responsive to the contents of said fourth register means for applying a signal to enable said fifth gating circuit means irrespective of the presence or absence of said second operation code signal and said second signal.

22. Apparatus according to claim 13 having fourth gating circuit means responsive to said selected one of said operation code signals and said enabling signal for connecting the contents of said register stages to said input-output bus.